United States Patent [19]

Daw

[11] Patent Number: 5,226,162
[45] Date of Patent: Jul. 6, 1993

[54] ASSIST PROGRAM FOR OPERATING A DEBUG PROGRAM IN CONJUNCTION WITH A USER PROGRAM

[75] Inventor: Royal H. Daw, Sherman Oaks, Calif.

[73] Assignee: International Business Machines Corpration, Armonk, N.Y.

[21] Appl. No.: 468,162

[22] Filed: Jan. 22, 1990

[51] Int. Cl.$^5$ .............................. G06F 9/44
[52] U.S. Cl. ................... 395/700; 364/286.2; 364/DIG. 1; 364/267.91; 395/575; 395/500; 371/19
[58] Field of Search ............ 395/700, 575, 500; 371/19

[56] References Cited

U.S. PATENT DOCUMENTS 5,038,348 8/1991 Yoda et al. .......................... 371/19

OTHER PUBLICATIONS

Microprocessors and Microprogramming vol. 24, Nos. 1-5, Sep. 1988 pp. 153-159, Amsterdam NL; T. Bemmerl et al.: "Menu and Graphic Driven Human Interfaces for High Level Debuggers".
Software Practice and Experience vol. 19, No. 5, May 1989, pp. 437-460 Chichester, Sussex, GB: L. Lopriore: "A User Interface Specification for a Program Debugging and Measuring Environment".
Database WPIL Derwent Publications Ltd., London, GB, Database WPIL, Anonymous: "C-Programmers workbench utility-reduces amount of interaction with system for compiling programs and conceals many details of listing process for users" & International Technology Disclosure, No. 2, Aug. 1985.
Patent Abstracts of Japan, vol. 12, No. 470 (P-798) 9 Dec. 1988; and JP-A-63189948 (Fujitsu Ltd.) May 8, 1988 Abstract.

*Primary Examiner*—Lawrence E. Anderson
*Attorney, Agent, or Firm*—Perman & Green

[57] ABSTRACT

A data processing system is described which contains a first program for enabling the operation of interactive second and third programs, the second program requiring program parameters and file data from the third program in order to operate in conjunction therewith. The first program displays a menu of functions performable by the second program when it is run in conjunction with the third program. The first program responds to a user-selected menu function by employing the method of: extracting from the third program, parameters required for operation of the second program and placing such parameters in a format usable by the second program; constructing input files for the second program which include command listings required to perform a user-selected menu function, and indications of program sequences to be operated upon by the menu function; and executing the selected menu function by employing the command listings to enable automatic interactive operation of the second and third programs.

4 Claims, 3 Drawing Sheets

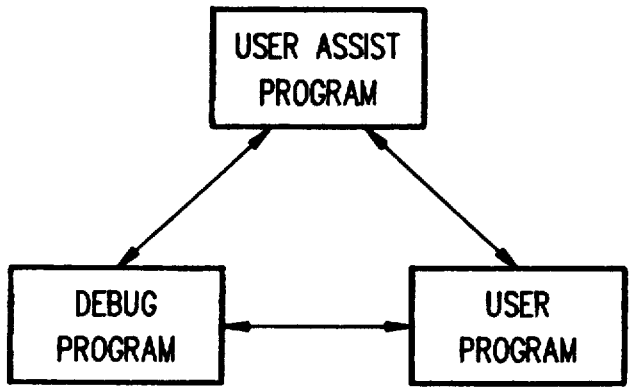

FIG. 1

Debug Menu a) m = Command (m = 0, 1, 2...)
b) .m = File list of data files for m
c) ..m = Display Help for m

```
0  EXIT
1  FortsTn   SCALAR:           Compile for scalar load mode tuning with 3,4,8
2  FortvTN   VECTOR:           Compile for vector load mode tuning with 3,4,5,6,7,8,
3  IADLINMD  SCALAR OR VECTOR: Time the program module
4  IADLINMD  SCALAR OR VECTOR: Time subroutines of program
5  IADLINMD  VECTOR:           Time analyzable do loops:
6  IADLINMD  VECTOR:           Sample do loops, pgms, or statmnts
7  IADLINMD  VECTOR:           Vector statistics
8  IADLINMD  SCALAR:           Frq of exec of stmts or do lps.
9  FortsD    SCALAR:           Compile for Interactive Error Debugging with 10
10 IAD       SCALAR OR VECTOR: Interactive Debug Program
```

FIG. 2

ASSIST PROGRAM FOR OPERATING A DEBUG PROGRAM IN CONJUNCTION WITH A USER PROGRAM

FIELD OF THE INVENTION

This invention relates to interactively operational programs, and more particularly, to a user assistance program for enabling a debug program to interactively operate with a program under test.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Virtual machine (VM) programming systems for large mainframe data processing systems are well known. One software operating system which operates under VM is termed CMS (Conversational Monitor System). CMS allows plural user programs, on a large mainframe, to be simultaneously executed, with each user apparently having a separate "machine" dedicated to that user's software. Of necessity, software written to run under the CMS operating system is complex and requires detailed debugging before it can be reliably operated.

Debugging programs characteristically allow a program-under-test to be operated, statement by statement, with both the input conditions and the output conditions, at each statement, being made available to the programmer for problem resolution. Furthermore, debug programs also enable various routines, sub-routines, entire programs etc. to be timed, and for statistics to be accumulated indicating the relative performance of the software segments.

One such debug program product is called "Interactive Debug", and is marketed by the International Business Machines Corporation as a programming system for debugging programs written in VS Fortran. Interactive Debug (hereinafter called IAD) runs in parallel with a user program and essentially controls the user program to enable it to be interrupted at any selected point, or points; to have any portion assessed as to its execution time; and to accumulate comparative operating statistics.

In order to operate in conjunction with a user program, IAD requires the establishment of certain debug files which define the test functions to be carried out, and identify user program file names and various file parameters of the program-under-test. These identifiers enable the IAD program to control the execution of the user program and provide other general information which enables IAD to fully function in cooperation with the user program.

The IAD program, by its nature, is complex and involves an extensive command structure. As such, the application programmer is not able to operate the IAD program without expending significant time to become familiarized with the details of the IAD protocols. Since application programmers employ debug programs and, in particular the IAD program, on an exception basis, each time the debug program is used, considerable time must be expended in familiarization. Furthermore, the debug program is, itself, subject to constant change and alteration. For instance, it often occurs that a debug program is written with one programming system in mind and is formatted to comply with the requirements of that system. When the debug program is then applied to another software system or an improved system wherein data formats have been altered, or if the debug program has been altered, the programmer must be aware of these changes and accommodate them — a difficult problem for an infrequent user of the debug program.

Accordingly, it is an object of this invention to provide a user assist program which automatically enables one program to operate in conjunction with another program.

It is another object of this invention to provide a user assist program which enables a program under test to automatically run with a debug program.

SUMMARY OF THE INVENTION

A data processing system is described which contains a first program for enabling the operation of second and third programs, the second program requiring program parameters and file data from the third program in order to operate in conjunction therewith. The first program displays a menu of functions performable by the second program when it is run in conjunction with the third program. The first program responds to a user-selected menu function by employing the method of:

extracting from the third program, parameters required for operation of the second program and placing such parameters in a format usable by the second program.

constructing input files for the second program which include command listings required to perform a user-selected menu function, and indications of program sequences to be operated upon by the menu function; and executing the selected menu function by employing the command listings to enable automatic interactive operation of the second and third programs.

DESCRIPTION OF THE DRAWINGS

FIG. 1 is a diagram which indicates the relationship of the user assist program to both debug and user programs.

FIG. 2 illustrates a debug menu displayed by the user assist program during its operation.

DETAILED DESCRIPTION OF THE INVENTION

Figure 3:
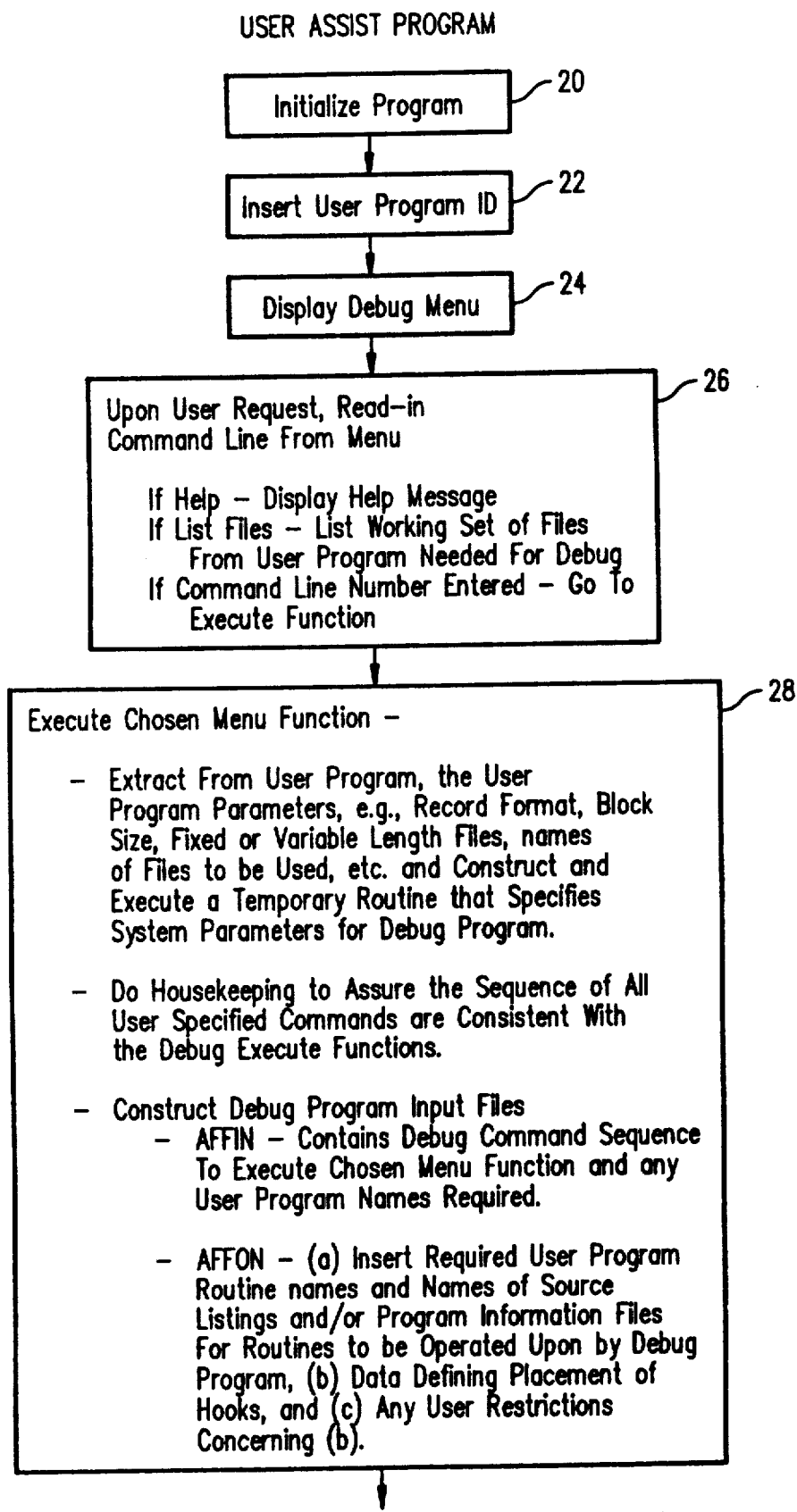
FIGS. 3 and 4 illustrate a high level flow diagram of the method of operation of the user assist program.
Figure 4:
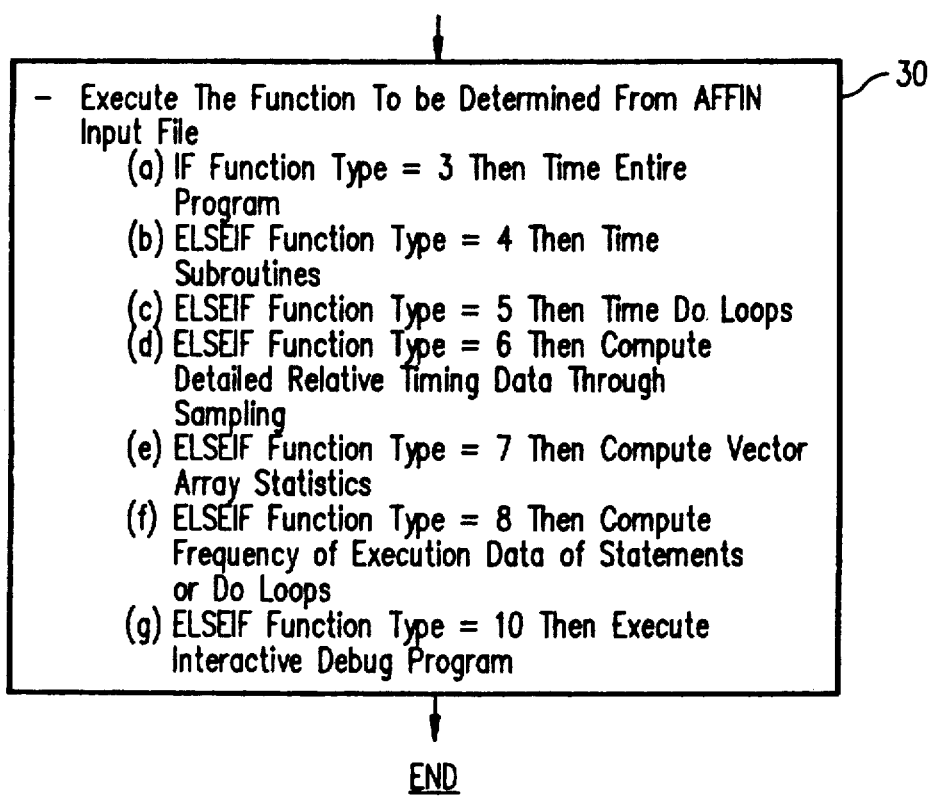

In FIG. 1, a debug program is shown interactively operating with a user program, both being overlaid by a user assist program. The user assist program provides the debug program with program parameters, file data, etc. from the user program. The debug program uses those inputs to establish its own files which then enable it to interface with the user program, and to perform its functions with respect thereto. These functions include the timing or analysis of various subroutines, programs etc., or the operation of the user program on a statement-by-statement basis to enable individual statements to be debugged.

The user assist program enables automatic construction of debug program files that are required to enable the debug program to exert control over the user program. The User assist program thus enables initialization of the debug program and allows the application programmer to avoid the need to spend familiarization time with respect to the operation and structure of the debug program. While in this example, the programs are constructed to operate in a CMS environment and to employ VS Fortran as the main programming language, obviously the invention applies to other operating systems and programming languages.

During the operation of the user assist program, a debug menu, such as is shown in FIG. 2, is displayed. The debug menu contains three upper lines a, b, and c which enable the user to select one of the listed commands, to wit: to select a particular numbered function via a command listed in the menu; to access a file list of files required for a selected command function; or to call for help with respect to a particular command function.

In the menu shown in FIG. 2, ten functions are shown with functions 3–8 being those which are most relevant to the operation of the user assist program. Functions 1, 2, and 9 provide the ability to compile the user program in either a scalar, vector, or scalar-interactive debug mode. Lines 3–8 define specific functions or commands which may be carried out by the debug program in conjunction with the user program. For instance, line 3 first indicates that the command may be used with a user program that has been compiled on either a scalar or vector basis, and further enables the execution time of a program module to be timed.

Command line 4 enables each of the subroutines of the user program to be individually timed and accepts compilation in either scalar or vector mode. Command lines 5 and 6 require vector compilation and enable do loops and other statements to be timed or otherwise analyzed. Command line 7 may only be used with a vector compiled user program and enables statistics to be accumulated regarding arrays in the user program which operate in the vector mode. By collecting statistics regarding the size and number of arrays (including matrices), it can be determined if it is best to execute a program in the vector or scalar mode (i.e. the more arrays, the more likely it is that a program will execute faster in vector mode).

Command line 8 requires scalar compilation and collects statistics concerning frequency of execution of statements or do loops. Command line 10 indicates upon selection, that the debug program operates in the interactive mode, rather than in the automatic mode contemplated by command lines 3–8. In this instance, the debug program sequences through user program statements, stopping at the end of any user specified statement to enable user interaction.

Turning now to FIG. 3, a high level flow diagram illustrates the operation of the user assist program in conjunction with the debug and user programs. As above stated, the user assist program is based on a menu framework that guides the user in using debug functions in relation to a user program. Information to initialize the functions is extracted from the user program. Once the functions are initialized, the user assist program enables the debug program to execute a designated menu command.

The user assist program commences by initializing its parameters in preparation for operation (box 20). The user then inserts an identifier of the user program (box 22) and the program displays a debug menu, such as is shown in FIG. 2 (box 24). At this point, the user will request actuation of one of the menu command lines. If the user inputs a help indication, a concise help message is displayed. If a "List Files" command line is indicated, a list of a working set of files from the user program, needed for operation of the debug program, is displayed. If the user inputs a command line (e.g., one of lines 3–8), then the program immediately proceeds to execute the specified command.

The execute function is shown in box 28 and comprises a plurality of substeps. Initially, certain parameters are extracted from the user program which will be required for the operation of the debug program. Some of these parameters include record formats, block size, whether the user program files are fixed or variable length, names of files to be used, etc., etc. Once these parameters are extracted, a temporary routine is constructed which arranges the parameters in the manner and the format required for the debug program. Thus, the application programmer does not need to be aware of specific debug format requirements as, these are considered and taken care of automatically by the user assist execute function.

Next, the user assist execute function performs housekeeping actions that assure that the sequence of user specified commands are consistent with the debug execute functions. The housekeeping actions also assure that the physical formats of the input files are consistent with debug program requirements and furthermore, that both the debug and user programs have been compiled using consistent vector or scalar modes of compilation.

Next, the execute function constructs two files, (i.e. AFFIN and AFFON) for the debug program which are critical to its operation. The assembly of the AFFIN file results in the entry of a command list for the debug program that the user would enter if the debug program were in an interactive mode. In essence, it mechanizes a particular interactive mode sequence and specifies the debug command requirements for the selected menu function. The file may also contain certain user program names to enable references thereto.

The second file which is automatically constructed is termed AFFON and is employed to find the parts of the user program that are to be affected by the commands in the AFFIN file. Thus, the AFFON file contains user program routine names and names of source listings and/or program information files to be operated upon by the debug program. Furthermore, the AFFON file includes data which defines for the debug program, where "hooks" should be placed in the user program. A "hook" is a program marker which signals the debug program to interrupt operation of the user program. Without hooks, a user program executes from beginning to end and then ceases operation. By inserting hooks at certain points in the user program, the program automatically ceases operation at a hook, and enables the programmer or the debug program, itself, to examine the results achieved up to that interrupt time.

If the user does not restrict placement of hooks in the user program, a default situation occurs wherein a hook is automatically installed by the debug program at the end of each statement. Thus, the debug program essentially executes a user program statement and then interrupts to check if data is required at the statement. If the current mode is "interactive", the program halts to allow the programmer to display data, enter a command or to signal a recommencement of operation. Ordinarily, the user will insert hooks only at specific places in the program, so the default hooks are overridden and the required hooks are specified by the user in the AFFON file.

Once the above noted files and parameters have been prepared, the debug program proceeds to execute the function defined by the command sequence contained in the AFFIN file (see box 30). Pseudo-code listing a-g in box 30 indicates the various alternatives available in the execute function routine, and each is based upon the user indicating a particular line in the debug menu of FIG. 2.

For instance, if the user indicates line 3 from the debug menu, the debug program performs a routine which times the full program from beginning to end and then stops. If the user indicates line 4, the debug program times each of the subroutines in a user program. An indication of line 5 causes the execute function to time each of the do loops within the program. An indication of line 6 causes the debug program to determine what routines in the user program consume the most time. This is accomplished by timing of the execution of sampled routines in the program. An indication of menu line 7 causes a count of arrays (and their sizes) to be accumulated for those which are operated on in the vector array portion of the processor. Line 8 from the menu enables the frequency of execution of statements or do loops to be determined and reported.

All of execute functions a-f are automatic and proceed without user interaction. If however the user wishes to use the "interactive" debug aspects of the debug program, where each statement is serially executed and the user may specify where execution should halt, the programmer may select line 10 which overrides the automatic sequences and causes the interactive debug program to run in the known manner.

As can be seen from the above, the provision of the user assist program releases the user from the necessity of understanding the latest revision state of the debug program, and from having to assure that data entered into the debug program from the user program is assembled in accordance with the debug program requirements.

To enable a fuller understanding of the details of the User Assist program, its specific data formats, file formats, etc, a source code listing thereof is included as Appendix A. The included source code listing may be run on an IBM 3090 computing system which has a CMS operating system installed.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

APPENDIX A

USER ASSIST PROGRAM

COPYRIGHT 1989

INTERNATIONAL BUSINESS MACHINES CORPORATION

RSPMNU EXEC - 1

```
/*   test xedit environment */
trace off
arg fnctn
t= 'TEMP'
a= ''
f= "FILE1"
push fnctn
push 'rspmnu'
"XEDIT " T f
env=address()
exit
/*================================================*/
trace off
'CP SP CONSOLE PURGE CLOSE TERM'
/* Generate Data & Menu Parms for level 1 menu: typ= # of periods   */
address CMS
"SET CMSTYPE HT"
```

```
"SET CMSTYPE RT"
"SET FULLSCREEN RESUME"
"SET WINDOW CMSOUT NOTOP"
"WINDOW CLEAR"
"SET FULLSCREEN SUSPEND"
address XEDIT
'SET V ON 1 78'
'SET IMAGE ON'
fp.=''
nonam@= 0      /* Specifies how cmd.2 is used when cmd syntax is
                  analyzed, and how fn@ should be used:
                  0: cmd.2 is assumed as function name; 1: cmd.2 is not
                  used at all; 2: cmd.2 is used, but not for fcn name. */
mn.0= 1
nlvl= mn.0     /* Next node level from current menu (none) */
sb.0= 0
pth.= ''
pth.1= ''
wsu= ''        /* Initialized named and unnamed fileids to null */
wsn= ''
fd.0= 0
pull fn@
if fn@= '' then do
  m@= 'Welcome to the RSP Guided NIC Menu.&&The syntax is',
  '&   "RSPMNU filename" or "RSPMNU"',
  '&where "filename" is available for any menu function, that requires',
  'a filename until "filename" is respecified with some function.',
  '&&CMS commands may be executed by typing "CMS command".',
  '&&Hit ENTER to continue.'
  'SET COLOR * NON'
  call dsplymsg
  end
call s 0,nlvl  /* Defines lvl 1 menu by calling lvl 1 routines */
a= a
call s 1,nlvl
call menu
typ= rqline(1)
'QUIT'
exit
/*==================================================================*/
Rqline: procedure expose ml. cmd. cmdln typ sb. mn. pth. fd. mnup. mnul,
      fn@ m@ wsn wsu nonam@
arg lvl
trace off
do outer= 1
  /* Select function or menu to be executed */
  address xedit
  do forever
    READ CMDLINE
    parse upper pull cmdln
    /* Parse cmdln, get n= menu line #, mnl= max # of menu lines */
    typ= parsef()      /* Do basic parse, return no. of periods */
    if typ<0 then iterate outer
    /* Function specific parse fcn. May be 'quit' */
select
  when (cmd.1='N') then do
      address CMS "TYPE NEWS FILE"
    end
  when (cmd.1="CMS") then do
      address CMS subword(cmdln,2)
    end
  when (cmd.1='QUIT')|(cmd.1=0) then do
      QUIT
      /* Restore the menu and fcn data */
```

```
      i= mn.0
      mn.i= ''              /* Reset to null */
      mn.0= mn.0 -1
      /* s.i= menu setup subrt of level i */
      if mn.0= 0 then return 0    /* At level 1 of menu */
      i= mn.0
      interpret sb.i        /* Restore the menu and fcn data */
      cmd.2= fn@
   end
otherwise do
      /* Execute the fcn: lvl i, line cmd, sec 1 */
   /* Select and execute fcn, display files, or help */
      i= mn.0           /* path to node name of current menu */
      j= mn.0 +1
      fd.0= 0
      pth.j= pth.i||right(cmd.1,2,0)  /* possible menu & its path */
      interpret 'call s'pth.j typ','j
   select
      when RESULT= 'H' then do    /* Print help message */
         call dsplymsg
       end
      when RESULT= 'M' then do    /* Build file for menu */
         mn.0= mn.0 +1
         i= mn.0
         call menu
         cmd.2= fn@
      end
     when RESULT='D' then do
        if (cmd.2='')&(nonam@=0) then do
           if fn@<>'' then do
              cmd.2= fn@
              say '_'cmd.1 cmd.2
              say 'Hit enter to continue, any other character to cancel.'
              parse upper external respons
              if respons='' then
                 err= fdat(cmd.2)   /* files with given filename */
           end
           else do
              MSG 'SYNTAX is: .'cmd.1' filename'
              cmd.2= fn@
           end
        end
        else
           err= fdat(cmd.2)
     end
     when (cmd.2='')&(nonam@=0) then do
       /* cmd uses default function name */
       if fn@><'' then do
          cmd.2= fn@
          address CMS "SET FULLSCREEN RESUME"

address CMS "WINDOW CLEAR ="
            say cmd.1 cmd.2
            say 'Hit enter to continue, any other character to cancel.'
          address CMS "WINDOW HIDE CMSOUT"
            parse upper external respons
          address CMS "SET FULLSCREEN SUSPEND"
          if respons='' then do
             call xeqfcn RESULT cmd.2
             if RESULT=2 then iterate
          end
       end
       else do
          MSG 'SYNTAX is: 'cmd.1' filename'
          cmd.2= fn@
```

```
                    end
                  end
                otherwise do     /* Default or new name not part of function
                                    e.g. tempdisk cyl mode addr */
                    call xeqfcn RESULT
                    if RESULT=2 then iterate
                  end
                end
            if (nonam@=0) then do
                fn@= cmd.2   /* Save current name in case it was changed */
              end
              else nonam@= 0  /* Reset to default */
            end
          end
        end /* forever */
      end outer
return typ.
/*================================================================*/
xeqfcn: procedure           expose m@ noname@
/*       Execute argument toxeq? */
trace off
arg toxeq
/* See 'CMS COMMAND SEARCH ORDER' and 'CMS COMMAND EXECUTION
   CHARACTERISTICS' p54-56 in VM/XA CMS USER'S GUIDE. */
nn= 0                /* Error exit flag */
address XEDIT
dd= toxeq            /* trial */
if (m@<>'M@')&(m@<>'') then call dsplymsg  /* not undefined or null */
parse upper var dd wd1 wd2 wd3 wd4
if wd1='EXEC' then do      /* Filter out missing execs */
  address CMS "STATE "WD2" EXEC *"
  if (RC=0) then do
    address command dd
    if RC><0 then nn= 2
    end
  else do
      MSG "Routine not found"
      pull aa
      nn= 2        /* Iterate */
    end
  end
else do  /* Must be module, command, etc. */
  if dd<>'' then do
    address CMS dd
    if RC=0 then nn= 2  /* iterate */
    else do
      MSG "Routine not found"
      nn= 2         /* Iterate */
      end
    end
  end
return nn
/*================================================================*/
dsplymsg: procedure           expose m@ noname@
trace off
ll= 73
p= 1
m@= m@||'&'
address CMS "SET FULLSCREEN RESUME"
address CMS "WINDOW CLEAR"
do until m@=''
  parse var m@ s '&' m@     /* extract a paragraph from t */
  m1= 1
  m2= m1+ll
```

```
s= s' '
do until m1>=length(s)
   m2= lastpos(' ',s,m2)
   l= substr(s,m1,m2-m1)
   msg l                    /* Display it */
   m1= m2+1
   m2= m1+11
   end
end
address CMS "WINDOW HIDE CMSOUT"
pull a
address CMS "SET FULLSCREEN SUSPEND"
return 0
/*================================================================*/
parsef: procedure  expose ml. cmdln cmd. fn@ nonam@
/* Extract the proper function name from the selected command line */
/* Chk syntax: names, type */
trace off
cmdw= word(cmdln,1)
cmd.0= 3
cmd.1= strip(cmdw,'b','.')    /* The command no. */
cmd.2= word(cmdln,2)          /* Get fn from this */
if cmd.2='/' then cmd.2= fn@
cmd.3= subword(cmdln,3)
typ= 0
if (cmd.1<>'QUIT') then do
   if ('NUM'=datatype(cmd.1))&(cmd.1<=ml.0) then do
      typ= length(cmdw)-length(cmd.1)+1    /* no. of periods */
      end
   else do
      if (cmd.1<>'N')&(cmd.1<>'CMS') then do
         MSG 'INVALID LINE NUMBER'
         typ= -1
         end
      end
   end
return typ
/*================================================================*/
fdat: procedure expose fd. F. wsn wsu cmd. nonam@
/*=== Build filelist of files in user's working set ============*/
arg fn
trace off
/*___ Build array of filenames from named and unnamed filenames ___*/
err= 1
F.1= 'WORKING SETHELP A'
/* Separate out the working set named and unnamed filenames */
if (wsn<>'')|(wsu<>'') then do
   j= 1
   if wsn<>'' then do
      /* Find all words in wsn */
      n= words(wsn)
      do k= 1 to n
         j= j+1
         F.j= cmd.2 word(wsn,k) A
         end
      end
   if wsu<>'' then do
      /* Find all strings in wsu */
      k0=1
      do forever
         k1= index(wsu,'#',k0)
         if k1=0 then leave
         j= j+1
         F.j= substr(wsu,k0,k1-k0)
```

```
        k0= k1+1
      end
    end
    F.0= j
  end
else do
  j= 1            /* fd. is not used now, could drop this */
  do i= 1 to fd.0
      j= j+1
      F.j= fd.i       /* put in a temporary array */
    end
  F.0= max(fd.0,1)
  end
errl= ausrfn()
err= pnld()         /* call pnld() */
wsn= ''
wsu= ''
return err
/*-----------------------------------------------------------*/
ausrfn: procedure expose F. cmd.
/*=== Add user's exec's filenames to array for working set ======*/
trace off
address CMS 'STATE 'cmd.2' EXEC'
trace off
if RC=0 then do
  address XEDIT
  push cmd.2 ' EXEC'
  "XEDIT "cmd.2" EXEC"
  call getuxfn
  "QQUIT"
  /* retrieve from stack into array */
  do i= F.0 +1 by 1 while queued()<>0
    pull F.i
  end
  F.0= i-1
end
address xedit
return 0
/*-----------------------------------------------------------*/
getuxfn: procedure
/* Get filenames from a user's exec for running on IADLINMD or IAD */
trace off
pull prgnam ftyp
address CMS
/* Extract out the filedefs */
/*"SET CMSTYPE HT" */
/*__If program exec exists, the EXEC or RESTART files can be created__*/
"SET CMSTYPE RT"
address 'XEDIT'
  "SET MSGMODE OFF"
  "SET WRAP OFF"
  'DISPLAY 0 2'
  'TOP'
  'N'
  "EXTRACT /CURLINE"
  xtyp= ''
  if left(strip(CURLINE.3,'L'),2)='/*' then xtyp= 'r'
  if xtyp= 'r' then do
    /*__ For REXX EXECS, eliminate comments __*/
    'C ,/*$*/,, * *'
    "TOP"
    DO until RC<>0
      "CL ,/*,"
```

```
            if RC=0 then do
               "C ,/*$,,"
               "EXTRACT /LINE"           /* Delete comment to end of line */
               m= LINE.1
               "CL ,*/,"
               'C. ,$*/,,'
               "EXTRACT /LINE"
               n= LINE.1
               l= n-m-1
               ':'m+1
               "DELETE "l
              end
           end
       end
/*__ Now get filedefs__ */
   rr= extract('filedef')
   'SET CASE MIXED'
/*__Add exit to EXEC file__*/
exit0:
return '0'
/*%%%%%%%%%%%%%%%%%%%%%%%%%%%%%%%%%%%%%%%%%%%%%%%%%%%%%%%%%*/
/*=== Subroutine to extract one command on one or two keywds ===*/
/*  If EXEC is REXX, continued lines are combined & quotes removed*/
/*   If filetype 'RESTART', quotes are removed */
Extract: procedure    Expose ftyp xtyp
parse upper arg keywd keywd2
trace off
/* keywd selects lines to be extracted. Restart= r => file is restart*/
'TOP'
'L /'keywd'/'
do while RC=0
   "EXTRACT /CURLINE"
   a= strip(CURLINE.3,'T')
   if left(a,1)="'" then  w= strip(word(a,1),"L","'")
   else w= strip(word(a,1),"L",'"')
   upper w
   if w<>keywd then do
      'L /'keywd'/'
      iterate
      end
   if keywd2<>'' then do
      w2= word(a,2)
      upper w2
      if w2<>keywd2 then do
         'L /'keywd'/'
         iterate
         end
      end
   c= right(a,1)
   "SET SELECT 2"
   /*++Include continued lines++*/
   DO i=1 by 1 while c= ','
      'N'
      'SET SELECT 2'
      'EXTRACT /CURLINE'
      c= right(strip(CURLINE.3,'T'),1)
      end i
   'L /'keywd'/'
   end
/*__If REXX exec, eliminate quotes, combine continued lines__*/
/*if (xtyp='r') then do */
   'SET DISPLAY 2'                  /* Display all selected lines */
   /* Quotes are ok for IADLINMD $temp$ exec */
   /*         but not for restart */
```

```
'TOP'
'L /'keywd'/'                    /* To first keywd line */
do while RC=0
  if (xtyp='r') then do
    c= ','
    d= ''
    do while c=','
      "EXTRACT /CURLINE"
      "DELETE"
      a= strip(CURLINE.3,'B')
      b= left(a,1)
      c= right(a,1)
      if (b='''') then      /* Eliminate quotes */
        if c=',' then
          parse var a  "'"a"',"
        else
          parse var a  "'"a"'"
      else if (b='"') then
        if c=',' then
          parse var a  '"'a'",'
        else
          parse var a  '"'a'"'
      d= d||a
    end
  end
  else do
    "EXTRACT /CURLINE"
    "DELETE"
    d= strip(CURLINE.3,'B')
  end
  /*____ Extract out the fileid ____*/ parse upper var d  p 'FILEDEF' dd 'DISK' fn ft fm etc
  fm= left(fm,1)       /* Allow for A4 filemode */
  if fn<>'' then do
    if fm<>'A' then do
      'STATE 'fn ft fm
    end
    push fn ft fm
    "U"
    "INPUT "fn ft fm
    "SET SELECT 1"
    "U"
  end
  'L /'keywd'/'
end
'SET DISPLAY 1'
/* end */
return '0'
/*------------------------------------------------------------*/
bld: procedure expose F. wsn wsu fd noname /* Show the data files */
/*____ Build filelist display from array F. of filenames ____*/
trace off
address CMS "SET CMSTYPE HT"
address CMS 'STATE TESTTT $TEMP$ A'  /* does file of ws names exist?*/
if RC><0 then do
n= 1
push "SDATE"              /* Command to sort filelist by date */
do i= n to F.0 until RC=0 /* Need to start with fn that exists (0)*/
  /* Build exec of filenames listed in menu entry */
  push "SAVE TESTTT $TEMP$ A"
  do j= F.0 to n by -1    /* step down to 1st fn that exists */
    push 'FILELIST 'F.j' (APPEND'  /* Gen filelist (xedit) */
  end j
  pull b                  /*                    */
```

```
      address CMS
      "FILELIST "F.i            /* Test if F.i file exists */
      n= n+1
      end i
    address
    end
address CMS "ERASE TESTTT $TEMP$ A"
address CMS "SET CMSTYPE RT"
/* Reset named and unamed fileids to null */
fd.0= 0
address XEDIT
return '0'
/*================================================================*/
menu: procedure expose ml. mn. mnup. mnul m@ nonam@
/* Trial generate level a menu from data array ml. & hdg mnuh */
arg mnuh
trace off
env=address()
address XEDIT
push 'P'
d= 'RSP MENU'||mn.0
c='XEDIT rsp menu'||mn.0
interpret c
if RC><0 then "XEDIT "d
pull dmy
SET MSGLINE ON 3 2
'SET TOFEOF OFF'
'SET COLOR * NON'
'SET SCALE OFF'
'SET PREFIX OFF'
'SET IMAGE ON'
i= ml.0 +1
l= 36+ length(ml.i)%2
mnu= right(ml.i,1)         /* Get menu heading */
mnup.1
mnup.2
mnup.3
'SET RESERVED'mnul+5' Y N' mnu
mnup.4
'SET RESERVED'mnul+7' Y N  0 EXIT'
do i= 1 to ml.0
  a= right(i,2)
   'SET RESERVED '7+mnul+i' Y N' a ml.i
end
/*mnul= 2
mnup.=''*/
mnup.0= 4
return
/*================================================================*/
s: procedure expose ml. sb. mn. pth. mnup. mnul wsn wsu nonam@
/* Get parameters for root  menu made of 01, 02, 03 etc. fcns */
arg s,lvl
trace off
/*signal value(s's'pth.lvl)*/
signal value(s's')
0s:  /* Set line for menu. */
   return 'RSP Menu'      /* For generating menu line */
1s:
  nlvl= mn.0
  sb.0= sb.0 +1
  sb.lvl= 'call s 1,'lvl /* Not used since this is top menu */
  mn.0= 1                /* lvl # */
  mn.lvl= 8              /* # lines in menu this lvl */
  ml.0= 8
```

```
h= ml.0+1
1.mh= 'RSP Menu'
nul= 4
nup.0= 4
nup.1='SET RESERVED 'mnul'   r N  m                    Command (m= 0,1...)'
nup.2='SET RESERVED 'mnul+1' r N  .m                   Filelist the data files for m'
nup.3='SET RESERVED 'mnul+2' r N  ..m                  Display Help for m'
nup.4='SET RESERVED 'mnul+3' g N  N News               News of changes to RSP Menu'
1.1=s01( 0)      /* Parameters to display Fortran Menu */
1.2=s02( 0)         /* Note Fcn, List files, Help are (2),(3),(4)*/
1.3=s03( 0)
1.4=s04( 0)      /* Setup line 4 in menu */
1.5=s05( 0)
1.6=s06( 0)
1.7=s07( 0)
1.8=s08( 0)
eturn  'M'              /* Return flag indicating this fcn is menu */
1.9=s09( 0)
* Could eliminate this in subroutine if tested for menu fcn sbr */
eturn
 MSG 'No data files for a menu'
eturn
 nonam@= 1
 'Help not installed yet.'
eturn 'H'
================================================================*/
: procedure expose ml. fd. cmd. sb. mn. m@ wsn wsu nonam@
 s,lvl .    /* s:section no.in this rtn, l:line no. in menu*/
ce off
   Output line text for menu node lvl 1 or 2) Function to generate
   node level 2 made of 0101, 0102, etc */
nal value(s's01')
1: /*-Set line for menu. */
urn 'Fortran Menu    Release 2.3'
For generating menu line, lvl 1 */
1: /*-Function is to Define a lvl 2 Fortran Menu */
lvl= 1              /* mn.0= levels 0, mn.i= #lines for menu i */
l= mn.0
lvl= 'mn.'lvl'=s01(1,'lvl')'
0= 13                /* Set max fcn # in menu */
 ml.0+1
mh= 'Fortran Menu'    /* Menu heading */
1=s0101( 0)     /* IAD Menu    Menu of Interactive Debug Tools */
2=s0102( 0)     /* Conversion menu */
3=s0103( 0)
4=s0104( 0)
5=s0105( 0)
6=s0106( 0)
7=s0107( 0)
8=s0108( 0)
9=s0109( 0)
10=s0110( 0)
11=s0111( 0)
12=s0112( 0)    /* ACRITH: High accuracy arithmetic subr. library */
13=s0113( 0)    /* Execute the user's exec with the given name */
urn 'M'
14=s0114( 0)
1: /*-Specify files used in d. array */
= 'LISTING TEXT'
urn 'D'
1: cmd.2= '2'
 'Menu for Fortran Interactive Debug, Conversion, Execs to compile',
nd run, Fortran libraries that are available other than the ',
```

'standard.&For assistance, send a note to ROY at LASCXA, or call',
'Roy Daw at 213-312-5471.'
return "H"
/*================================================================*/
s0101: procedure expose ml. fd. cmd. sb. mn. m@ wsn wsu nonam@
arg s,lvl .    /* s:section no.in this rtn, l:line no. in menu*/
trace off
/*    Output line text for menu node lvl 1 or 2) Function to generate
      node level 2 made of 0101, 0102, etc */
signal value(s's0101')
0s0101: /*-Set line for menu. */
/* For generating menu line, lvl 1 */
return 'IAD Menu    Menu of Interactive Debug and Vector Tuning Tools'
1s0101:
mn.lvl= 1           /* mn.0= levels 0, mn.i= #lines for menu i */
nlvl= mn.0
sb.lvl= 'mn.'lvl'=s0101('1,'lvl')'
ml.0= 11            /* Set max fcn # in menu */
mh= ml.0+1
ml.mh='IAD Menu'   /* Menu heading */
ml.1=s010101( 0)   /* Compile opt(3) scalar fortran for timing withIAD*/
ml.2=s010102( 0)   /* Compile vector fortran for IAD */
ml.3=s010103( 0)   /* Time the program module */
ml.4=s010104( 0)   /* Time the prgm subroutines */
ml.5=s010105( 0)   /* Time the analyzable do loops */
ml.6=s010106( 0)   /* Sample the do loops, pgms, or statements */
ml.7=s010107( 0)   /* Vector Statistics */
ml.8=s010108( 0)   /* Freq */
ml.9=s010109( 0)   /* Compile scalar opt(0)fortn for Debugging with Iad*/
ml.10=s010110( 0)  /* IAD */
ml.11=s010111( 0)  /* Tempdisk */
return 'M'
2s0101:   /*-Specify files used in d. array */
return 'D'
3s0101:
nonam@= 1      /* Show there is no function name used */
m@= "The IAD execs assume the user's EXEC does not contain",
"a filedef which contains a argument of the EXEC.",
"&&The IADLINMD execs are used for timing and tuning FORTRAN programs",
"and make use of the following files: AFFIN1 to AFFIN5, and AFFON1 to"
m@= m@||" ",
"AFFON5. See Interactive Debug Guide and Ref., SC26-4223, for a",
"description of these files. The IAD AFFOUT file is renamed to have",
"a filetype 'logn:mm' where n corresponds to menu function 'n' and mm",
"identifies successive runs.&&Errors:",
"& 1.Errors that cause program termination: If the user allocated",
"a file to unit 6, the termination message will be written to 6",
"otherwise the message will be written to the console, and AFFOUT",
"file (See above)."
m@= m@||"& 2. To locate logical errors: The program should be compiled",
"with the FORTSD exec (9), and then use (10) IAD fullscreen mode.",
"Use of other compiler options results in optimized code and you",
"do not get correct values by listing the variable names.",
"RSPMNU will generate a RESTART file automatically from the user's",
"EXEC if the exec has the same name as the fortran program file."
m@=m@||" For examples of filedefs, see RUNXAS, RUNXAV, and RUNMXAV.",
"& 3.To have underflows set to 0, use CALL XUFLOW(0). See",
"SC26-4221."
return "H"
/*================================================================*/
iadlmmsg: procedure expose cmd. m@ nonam@
m@= "SYNTAX: '"cmd.1" fn1 fn2', where 'fni' are the filenames of",
"the files.",
"'"cmd.1" /', or '"cmd.1"',",

```
"can be used after 'fn' has been specified once.",
"& 1.If 'fn EXEC' exists, any filedefs within the exec will be",
"executed prior to executing 'fn text'. The IAD execs assume the",
"user's EXEC does not contain filedefs that have a user EXEC's",
"parameter in them.",
'& 2.Execute the 'fn', compiled with"
return 'H'
/*================================================================*/
s010101: procedure expose cmd. fd. sb. ml. mn. m@ wsn wsu nonam@
arg s,lvl .
signal value(s's010101')
)s010101:
return 'FortsTn    SCALAR: Compile for scalar load mode tuning with',
  '3,4,8'
ls010101:
return ' EXEC FORTSTN 'cmd.2
s010101:
sn= 'LISTING FORTRAN TEXT ICAFILE'
su= 'FORTSD EXEC A#'
eturn 'D'
s010101: nonam@= 1
@= "SYNTAX: '"cmd.1" fn' where 'fn' is the filename.",
'"cmd.1" /', or '"cmd.1"'"',
can be used after 'fn' has been specified once.&",
&Compiles code for timing opt(3) scalar code with interactive debug"
eturn "H"
*================================================================*/
010102: procedure expose cmd. fd. sb. ml. mn. m@ wsn wsu nonam@
race off
rg s,lvl .
ignal value(s's010102')
s010102:
race off
eturn 'FortvTn    VECTOR: Compile for vector load mode tuning with',
  '3,4,5,6,7,8,10'
s010102:
eturn 'EXEC FORTVTN 'cmd.2
s010102:
sn= 'LISTING FORTRAN TEXT PIF ICAFILE'
su= 'FORTVD EXEC A#'
eturn 'D'
s010102: nonam@= 1
?= "SYNTAX:&'"cmd.1" fn' or '"cmd.1" /' where 'fn' is the program's ",
filename and '/' can be used after 'fn' has been specified once. ",
&Compiles code for vector tuning with interactive debug"
eturn "H"
*================================================================*/
)10103: procedure expose cmd. fd. sb. ml. mn. m@ wsn wsu nonam@
:g s,lvl .
:ace off
:gnal value(s's010103')
;010103:
:turn 'IADLINMD   SCALAR OR VECTOR: Time the program module'
;010103:
:turn 'EXEC IADLINMD 0 U 'cmd.2 cmd.3
;010103:
:n= 'LOGO:*S LOGO:*V PRINTOS PRINTOV LISTING FORTRAN AFFINO AFFONO',
    'LOGCNSL* EXEC ICAFILE PIF TEXT'
:u= ''
:turn 'D'
.010103: nonam@= 1
.11 iadlmmsg
=m@" FORTVTN (vector) or FORTSTN (scalar).",
and time the entire program. &  3.'.3 FN'",
```

·"will list those files with filename FN that are related to",
'this function. If a general FILELIST is desired at that point press',
'pfkey 10.'
m@= m@'&&COMMON ERRORS:& 1.AFF867E is due to output file not being',
'erased. & 2.Screen is blank after and program does not appear to be',
'executing: try SP CONSOLE CLOSE STOP as the program is run with',
'the console spooled to the rdr and no data being printed on the screen'
m@= m@'&&WORKING SET OF FILES:&Those files that are most commonly used',
'including the following filetypes. LOG0:nS and LOG0:nV give the timing',
'data for n= 0,1.. for successive runs. LOGCNSL gives the users output',
'data to the screen and normally shows errors when the program stops.',
'If the users input and output files have the',
'filename of the program and the filetypes start with',
'INP and OUT respectively, they will be listed also.'
return "H"
/*================================================================*/
s010104: procedure expose cmd. fd. sb. ml. mn. m@ wsn wsu nonam@
arg s,lvl .
signal value(s's010104')
0s010104:
return 'IADLINMD   SCALAR OR VECTOR : Time subroutines of program'
1s010104:
return 'EXEC IADLINMD 1 U 'cmd.2 cmd.3
2s010104:
wsn= 'LOG1:*S LOG1:*V PRINT1S PRINT1V LISTING FORTRAN AFFIN1 AFFON1',
     'LOGCNSL* EXEC ICAFILE PIF TEXT'
wsu= ''
return 'D'
3s010104: nonam@= 1
call iadlmmsg
m@=m@" FORTVTN (vector) or FORTSTN (scalar).",
" and time the routines of the program.&",
"The results of the timing is in 'fn LOG1V'.",
"& 3.Routines can be forced to scalar or vector by using compiler",
"directives with the 'PROCESS' statement. e.g.",
"&@PROCESS DIRECTIVE('*SDIR:'),",
"&@PROCESS DC(SVEC,",
"&@PROCESS NVEC)",
"&Here the directive specifies a trigger string. The string can be"
m@=m@" used at the start of a comment to force following do loops to",
"compile scalar or vector:",
"&C*SDIR: PREFER SCALAR ON",
"&at the start and",
"&C*SDIR: PREFER SCALAR OFF",
"&at the of the routine will compile all do loops in the",
"routine as scalar."
return "H"
/*================================================================*/
s010105: procedure expose cmd. fd. sb. ml. mn. m@ wsn wsu nonam@
arg s,lvl .
signal value(s's010105')
0s010105:
return 'IADLINMD   VECTOR: Time analyzable do loops: 6 to 7 times slower'
1s010105:
return 'EXEC IADLINMD 2 V 'cmd.2 cmd.3
2s010105:
wsn= 'LOG2:*V PRINT2V LISTING FORTRAN AFFIN2 AFFON2 EXEC',
     'ICAFILE PIF TEXT LOGCNSLV'
wsu= ''
return 'D'
3s010105: nonam@= 1
call iadlmmsg
m@=m@" FORTVTN (vector)",
"and time analyzable do loops. The results of the timing is in", 'fn LOG2V'.",
3.See '..4' for forcing 'DO' loops to compile as scalar or vector.",
he 'trigger strings' precede and follow 'DO' loops rather than",
ubroutines."
turn "H"
=====================================================================*/
10106: procedure expose cmd. fd. sb. ml. mn. m@ wsn wsu nonam@
g s,lvl .
gnal value(s's010106')
010106:
turn 'IADLINMD   VECTOR: Sample do loops, pgms, or statmnts'
010106:
turn 'EXEC IADLINMD 3 V 'cmd.2 cmd.3
010106:
]= 'LOG3:*V PRINT3V LISTING FORTRAN AFFIN3 AFFON3 ICAFILE EXEC',
   ' PIF TEXT LOGCNSLV'
]= ''
:urn 'D'
)10106: nonam@= 1
.1 iadlmmsg
:m@" FORTVTN (vector)",
nd sample do loops, programs, or statements. The results of",
he sampling is in 'fn LOG3V'"
urn "H"
=====================================================================*/
0107: procedure expose cmd. fd. sb. ml. mn. m@ wsn wsu nonam@
s,lvl .
nal value(s's010107')
10107:
urn 'IADLINMD   VECTOR: Vector statistics'
10107:
urn 'EXEC IADLINMD 4 V 'cmd.2 cmd.3
10107:
= 'LOG4:*V PRINT4V LISTING FORTRAN AFFIN4 AFFON4 ICAFILE EXEC',
  'PIF TEXT LOGCNSLV'
= ''
urn 'D'
10107: nonam@= 1
l iadlmmsg
m@" FORTVTN (vector)",
id compute the execution time statistics on vectors.",
ie resulting statistics are in 'fn LOG4V'.",
is helps you determine the lengths of your vectors if they vary."
irn "H"
=====================================================================*/
)108: procedure expose cmd. fd. sb. ml. mn. m@ wsn wsu nonam@
s,lvl .
ial value(s's010108')
.0108:
irn 'IADLINMD   SCALAR: Frq of exec of stats or do lps. 30 times',
wr. See '..8'"
.0108:
irn 'EXEC IADLINMD 5 U 'cmd.2 cmd.3
0108:
 'LOG5:*S LOG5:*V PRINT5S PRINT5V LISTING FORTRAN AFFIN5 AFFON5',
 'EXEC LOGCNSL* ICAFILE PIF TEXT'
 ''
rn 'D'
0108: nonam@= 1
 iadlmmsg
m@" FORTSD (See 9)",
d calculate the frequency of execution of statements or do ",
ps for one routine of the program. Specify the routine in the", "'affin' file by copying IAD AFFIN5 A to 'program_name AFFIN A',",
"then edit that file and change the 'Q MAIN' to 'Q rtn_name' where",
"'rtn_name' is the name of the subroutine or function.",
"When the program's affin file exists, it will not be set to IAD AFFIN5"
m@= m@"&   3.The frequency results are in the 'fn LOG5V' file.", "&   4.The programs can only be compiled for debug with OPT(0)",
"(See 9). Otherwise data is in the registers and the storage cells",
"yield incorrect results.&   5.The program may run up to 30 times slower"
return "H"
/*================================================================*/
s010109: procedure expose cmd. fd. sb. ml. mn. m@ wsn wsu nonam@
arg s,lvl .
signal value(s's010109')
0s010109:
return 'FortsD     SCALAR: Compile for Interactive Error Debugging',
   'with 10'
1s010109:
return 'EXEC FORTSD 'cmd.2
2s010109:
wsn= 'LISTING FORTRAN ICAFILE TEXT'
wsu= 'FORTSD EXEC A#'
return 'D'
3s010109: nonam@= 1
m@= "SYNTAX: '"cmd.1" fn' or '"cmd.1" /' where 'fn' is the program's ",
"filename and '/' can be used after 'fn' has been specified once.",
"&&Compiles opt(0) scalar code for debugging with interactive debug.",
" No statements are optimized out in this mode, and the program ",
"executes much slower than opt(3) or vectorized versions."
return "H"
/*================================================================*/
s010110: procedure expose cmd. fd. sb. ml. mn. m@ wsn wsu nonam@
arg s,lvl .
trace off
signal value(s's010110')
0s010110:
return 'IAD       SCALAR OR VECTOR: Interactive Debug Program'
1s010110:
return 'EXEC IADLINMD IAD U 'cmd.2   /* Check for IAD use, then ex it */
2s010110:
wsn= 'LISTING FORTRAN AFFIN AFFON RESTART EXEC'
wsu= ''
return 'D'
3s010110: nonam@= 1
m@= "SYNTAX: '"cmd.1" fn' or '"cmd.1" /' where 'fn' is the program's ",
"filename and '/' can be used after 'fn' has been specified once.",
"&Loads IAD with the program 'fn' for interactive debugging"
m@= m@||"&To check out the correctness of a program, the program",
"should be compiled with 'FORTSD' which is opt(0) and has a statement",
"for every debug hook.",
"Note that with 'vectorized code', 'AT' statements should normally",
"be outside the do loops as the do loop statements may not exist"
m@= m@||"&Helpful commands:&   0) To continue lines, use '-', then '""",
"at start of next line if need blanks",
"&   1) To stop within a subroutine: do 'q sbrtnm'",
",'AT line-no in sbrtn' or test as below, then type 'go'. Execution",
"should terminate on the 'AT' line. A 'list varnam' or 'autolist",
"varnam' will list varnam in the log or list it when it changes."
m@= m@||"&   2) To position to a line or statement no. within the",
"subroutine, use 'position line_no.' or 'search /string/'. To repeat",
"the search, use 'search'",
"&   3) If program terminates with error: type '"",
"WHERE FLOW' to get last 10 transfers, then use 'list' to check the",
"data values. &   4) To stop on a given statement for two conditions:",
"type 'AT line_no (if (x<3.2) if (x>2.20) halt% go)'. This will not",
"halt until both conditions are met."

```
eturn "H"
/*================================================================*/
010111: procedure expose cmd. fd. sb. ml. mn. m@ wsn wsu nonam@
rg s,lvl .
ignal value(s's010111')
s010111:
eturn 'Tempdisk   Format a temporary disk: cyl ac_mode address'
s010111:
f cmd.2= '' then cmd.2= '?'
onam@= 2          /* No name parameter for this function */
eturn 'EXEC TEMPDISK 'cmd.2 cmd.3
s010111: nonam@= 2
su= 'TEMPDISK EXEC A#'
ddress CMS 'Q SEARCH'
eturn 'D'
s010111: nonam@= 1
eturn "H"
/*================================================================*/
010110: procedure expose cmd. fd. sb. ml. mn. m@ wsn wsu nonam@
rg s,lvl .
ignal value(s's010110')
s010110:
eturn 'xxxxxxxxxxxxxxxxxxxxxxxxx'
s010110:
xxx
eturn RESULT
s010110:
eturn 'D'
s010110: nonam@= 1
eturn ""
/*================================================================*/
/*================================================================*/
0102: procedure expose ml. fd. cmd. sb. mn. m@ wsn wsu nonam@
rg s,lvl .    /* s:section no.in this rtn, l:line no. in menu*/
race off
*   Output line text for menu node lvl 2 or 2) Function to generate
    node level 2 made of 0201, 0202, etc */
ignal value(s's0102')
s0102: /*-Set line for menu. */
* For generating menu line, lvl 2 */
* Fortran Conversion */
eturn 'Conversion Menu of Fortran Conversion tools'
s0102:
n.lvl= 1          /* mn.0= levels 0, mn.i= #lines for menu i */
lvl= mn.0
b.lvl= 'mn.'lvl'=s0102(1,'lvl')'
l.0= 3            /* Set max fcn # in menu */
h= ml.0+1
l.mh= 'Conversion Menu'   /* Menu heading */
l.1=s010201( 0)           /* Vector43 */
l.2=s010202( 0)           /* DDTCMS */
l.3=s010203( 0)           /* CNVVAX */
eturn 'M'
l.4=s010204( 0)
l.5=s010205( 0)
l.6=s010206( 0)
s0102:  /*-Specify files used in d. array */
eturn 'D'
s0102: nonam@= 1
@= 'Helps for converting old IBM Fortran code or other vendors code'
turn "H"
/*================================================================*/
010201: procedure expose cmd. fd. sb. ml. mn. m@ wsn wsu nonam@
g s,lvl .
```

```
signal value(s's010201')
0s010201:
return 'vector43      Routine to interchange array rows and col.'
1s010201: return 'CALL vector43 'cmd.2
2s010201:
wsn= 'FORTRAN'
wsu= ''
return 'D'
3s010201: nonam@= 1
m@= 'A tool to aid the tuning of vectorizable programs. Call Roy Daw',
' at 213-312-5471, or send a note to Roy at LASCXA.'
return 'H'
/*================================================================*/
s010202: procedure expose cmd. fd. sb. ml. mn. m@ wsn wsu nonam@
arg s,lvl .
trace off
signal value(s's010202')
0s010202:
return 'DDTCMS         Translates old Versions of IBM Fort to Fort77'
1s010202:
address CMS "EXECIO * CP ( STEM MACH. STRING Q SET  "
parse var MACH.8 "MACHINE" x ","
if x><'370' then do
   m@= "This executes only with MACHINE CMS MODE. Do 'SET',
   "MACHINE 370', then 'IPL CMS'"
   return ""
   end
else
return ' EXEC DDTCMS 'cmd.2 cmd.3
2s010202: call nm
trace off
wsu= cmd.2 ft fm'#'cmd.2" COMPLIST "fm'#'cmd.2' DIAG 'fm'#',
    cmd.2' FORTRAN 'fm'#'
return 'D'
3s010202: nonam@= 1
return MSG "'See IBM Publication SC23-0145'"
nm: opt= ''
fm= pos('(',cmd.3)
if fm<>0 then do
  fm= substr(cmd.3,fm-1)
  opt= substr(cmd.3,fm)
  end
ft= word(cmd.3,1)
fm= word(cmd.3,2)
return
/*================================================================*/
s010203: procedure expose cmd. fd. sb. ml. mn. m@ wsn wsu nonam@
arg s,lvl .
signal value(s's010203')
0s010203:
return 'CNVVAX        Local routine to convert VAX ? to IBM Fortran 77'
1s010203: return MSG "'Not installed yet'"
2s010203: return 'D'
3s010203: nonam@= 1
m@= "'Not installed yet'"
return "H"
/*================================================================*/
s010204: procedure expose cmd. fd. sb. ml. mn. m@ wsn wsu nonam@
arg s,lvl .
signal value(s's010204')
0s010204:
return 'xxx      Line data'
1s010204:
call xxx cmd.2
```

```
eturn RC
s010204:
eturn 'D'
s010204:  nonam@= 1
eturn ""
*================================================================*/
010205: procedure expose cmd. fd. sb. ml. mn. m@ wsn wsu nonam@
rg s,lvl .
ignal value(s's010205')
s010205:
eturn 'xxxx     Line data'
s010205:
all xxx cmd.2
eturn RC
s010205:
eturn 'D'
s010205: nonam@= 1
eturn ""
*================================================================*/
010206: procedure expose cmd. fd. sb. ml. mn. m@ wsn wsu nonam@
rg s,lvl .
ignal value(s's010206')
s010206:
eturn 'xxxx     Line data'
s010206:
all xxx cmd.2
eturn RC
s010206:
eturn 'D'
s010206: nonam@= 1
eturn ""
*================================================================*/
010207: procedure expose cmd. fd. sb. ml. mn. m@ wsn wsu nonam@
rg s,lvl .
ignal value(s's010207')
s010207:
eturn 'xxxxx    Line data'
s010207:
all xxx cmd.2
eturn RC
s010207:
eturn 'D'
s010207: nonam@= 1
eturn ""
*================================================================*/
*================================================================*/
0103: procedure expose cmd. fd. sb. ml. mn. m@ wsn wsu nonam@
rg s,lvl .
ignal value(s's0103')
s0103:
eturn 'Fortvs2   Setup users default command'
s0103:
eturn 'FORTVS 'cmd.2 cmd.3
s0103:
sn= 'LISTING FORTRAN TEXT'
eturn 'D'
s0103: nonam@= 1
ddress CMS "HELP LASC FORTRAN"
@= 'See also FORTV EXEC, FORTS EXEC, FORTVD EXEC, FORTSD EXEC&'
@= m@'The SYNTAX is: 3 filname (options&'
@= m@'No filedefs are setup at this time'
eturn 'H'
*================================================================*/
```

```
s0104: procedure expose cmd. fd. sb. ml. mn. m@ wsn wsu nonam@
arg s,lvl .
signal value(s's0104')
0s0104:
return 'Fortv      VECTOR: Compile for vector load mode execution'
1s0104:
return 'EXEC FORTV 'cmd.2
2s0104:
wsn= 'LISTING FORTRAN TEXT PIF'
wnu= 'VSF2FORT TXTLIB A#VSF2LOAD LOADLIB *#CMSLIB TXTLIB *#FORTV EXEC A#'
return 'D'
3s0104: nonam@= 1
m@= "SYNTAX:   fortv fn&"
m@=m@"Compiles fortran program 'fn' in load mode and
 with vector optimization, cross referencing, global error checking
 (ICA), and the vector listing option XLIST&"
m@=m@"To examine the exec, use the menu '.n' to obtain a filelist
of related files, then edit the FORTV EXEC."
return "H"
/*================================================================*/
s0105: procedure expose cmd. fd. sb. ml. mn. m@ wsn wsu nonam@
arg s,lvl .
signal value(s's0105')
0s0105:
return 'Runv      VECTOR: Load vector text file and execute in load mode'
1s0105:
return ' EXEC RUNXAV 'cmd.2
2s0105:
wsn= 'TEXT'
return 'D'
3s0105: nonam@= 1
return ""
/*================================================================*/
s0106: procedure expose cmd. fd. sb. ml. mn. m@ wsn wsu nonam@
arg s,lvl .
signal value(s's0106')
0s0106:
return 'Runmv      VECTOR: If load module exists execute else build it then execute'
1s0106:
return ' EXEC RUNMXAV 'cmd.2
2s0106:
wsn= 'MODULE LISTING'
return 'D'
3s0106:
return
/*================================================================*/
s0107: procedure expose cmd. fd. sb. ml. mn. m@ wsn wsu nonam@
arg s,lvl .
signal value(s's0107')
0s0107:
return 'Forts      SCALAR: Compile for opt(3) scalar load mode execution'
1s0107:
return ' EXEC FORTS 'cmd.2
2s0107:
wsn= 'LISTING FORTRAN TEXT'
return 'D'
3s0107: nonam@= 1
return
/*================================================================*/
s0108: procedure expose cmd. fd. sb. ml. mn. m@ wsn wsu nonam@
arg s,lvl .
signal value(s's0108')
0s0108:
return 'Runs       SCALAR: Load scalar text file and execute in load mode'
```

```
s0108:
eturn ' EXEC RUNXAS 'cmd.2
s0108:
sn= 'TEXT'
eturn 'D'
s0108: nonam@= 1
eturn
*================================================================*/
0109: procedure expose cmd. fd. sb. ml. mn. m@ wsn wsu nonam@
rg s,lvl .
ignal value(s's0109')
s0109:
eturn 'PFP       PARALLEL: Fortran Compiler'
s0109:
SG 'PARALLEL FORTRAN IS NOT AVAILABLE YET'; RESULT= ''
eturn RC
s0109:
eturn 'D'
s0109: nonam@= 1
eturn
*================================================================*/
0110: procedure expose cmd. fd. sb. ml. mn. m@ wsn wsu nonam@
rg s,lvl .
ignal value(s's0110')
s0110:
eturn 'Linpack   SCALAR: Linpack library  '
s0110: nonam@= 1
SG 'Linpack is a subroutine library. See help'; RESULT= ''
eturn ''
s0110: nonam@= 1
su= 'LINPACK TXTLIB *#'
eturn 'D'
s0110: nonam@= 1
ddress CMS 'ACCESS 295 B/A'
LOBAL TXTLIB FORTLIB LINPACKA <LINPACKB> CMSLIB ...
eturn
*================================================================*/
0111: procedure expose cmd. fd. sb. ml. mn. m@ wsn wsu nonam@
rg s,lvl .
ignal value(s's0111')
s0111:
eturn 'ESSL      VECTOR or SCALAR: Engineering/ Scientific Subroutine Lib.'
s0111: nonam@= 1
eturn ''
s0111: nonam@= 1
;u= 'ESVVLIB TXTLIB *#ESVSLIB TXTLIB *#'
:turn 'D'
:0111: nonam@= 1
!= 'ESVVLIB is for vector programs, ESVSLIB is for scalar&'
!=m@'"See IBM Publication SC23-0184"'
:turn 'H'
*================================================================*/
)112: procedure expose cmd. fd. sb. ml. mn. m@ wsn wsu nonam@
·g s,lvl .
.gnal value(s's0112')
0112:
:turn 'ACRITH    High accuracy arithmetic subr. libr. training component'
·0112: nonam@= 1
:turn ' ACRITH'      /* Start online training session */
0112: nonam@= 1
·u= 'ACRITHSW MACLIB *#ACRITHHW MACLIB *#ACRITH TXTLIB *#'
:turn 'D'
0112: nonam@= 1
!= "Add global txtlib acrith and global maclib acrithsw or",
```

```
,"global txtlib acrithhw for your fortran compile or execution.&"
m@=m@ '"See manuals SC33-6164 and GX33-9009"'
return 'H'
/*================================================================*/
s0113: procedure expose cmd. fd. sb. ml. mn. m@ wsn wsu nonam@
arg s,lvl .
signal value(s's0113')
0s0113:
return 'Users EXEC Execute the user''s exec with the specified name'
1s0113:
return 'EXEC 'cmd.2
2s0113: nonam@= 1
wsn= 'EXEC FORTRAN TEXT LISTING'
return 'D'
3s0113: nonam@= 1
m@= "Execute the user's own exec directly with its parameters"
return 'H'
/*================================================================*/
s02: procedure expose ml. fd. cmd. sb. mn. m@ wsn wsu nonam@
arg s,lvl .     /* s:section no.in this rtn, 1:line no. in menu*/
trace off
/*   Output line text for menu node lvl 1 or 2) Function to generate
     node level 2 made of 0101, 0102, etc */
signal value(s's02')
0s02: /*-Set line for menu. */
return 'Graphics        Graphics programs on LASCXA'
1s02:
/* For generating menu line, lvl 1 */
mn.lvl= 1          /* mn.0= levels 0, mn.i= #lines for menu i */
nlvl= mn.0
sb.lvl= 'mn.'lvl'=s02(1,'lvl')'
ml.0= 9            /* Set max fcn # in menu */
mh= ml.0+1
ml.mh= 'Graphics Menu'    /* Menu heading */
ml.1=s0201( 0)     /* GDDM-IVU   GDDM Image Scanner */
ml.2=s0202( 0)     /* GDDM-ICU   GDDM Interactive Chart Utility */
ml.3=s0203( 0)     /* GDDM-VSE       */
ml.4=s0204( 0)     /*      -ISE  Image symbol editor */
ml.5=s0205( 0)     /*      -IMD  GDDM Interactive Map Definition */
ml.6=s0206( 0)     /*      -MSL      */
ml.7=s0207( 0)     /* GDDM graph  language */
ml.8=s0208( 0)     /* REXX           */
ml.9=s0209( 0)     /* GRAPHPAK       */
return 'M'
2s02:  /*-Specify files used in d. array */
return 'D'
3s02: nonam@= 1
m@= 'Graphic facilities available on the LASC machine are basicly GDDM
 and related programs, plus some presentation programs.&'
m@= m@'Hit return key (not enter), then 'd' to delete this window'
"HELP GDDM"
return ""
/*================================================================*/
s0201: procedure expose ml. fd. cmd. sb. mn. m@ wsn wsu nonam@
arg s,lvl .     /* s:section no.in this rtn, 1:line no. in menu*/
trace off
/*   Output line text for menu node lvl 1 or 2) Function to generate
     node level 2 made of 0101, 0102, etc */
signal value(s's0201')
0s0201: /*-Set line for menu. */
/* For generating menu line, lvl 1 */
return 'GDDM-IVU  Image Vu Utility: Create and edit scanned document',
 'images.'
1s0201: nonam@= 1   /* Save previous filename */
```

```
ddress CMS 'GLOBAL TXTLIB ADMPLIB ADMILIB ADMVLIB ADMKLIB ERXLIB ADMGLIB'
eturn ' ADMIVU'
s0201:  /*-Specify files used in d. array */
* Composed page printers, page 30 Img Vu Utility */
* Last 2 are Image and projection files */
sn= 'ADMPRINT PSEG38PP PSEG4250 LIST38PP LIST4250 ADMIMAGE ADMIMG',
    'ADMPROJ'
su= 'PROFILE ADMDEFS *#'
eturn 'D'
s0201: nonam@= 1
@= ( gddmdoc(m@))||', and Image View Utility (SC33-4079).'
eturn 'H'
*================================================================*/
ddmdoc: procedure
rg txt
xt= '   See HELP LASC, Locally Installed Programs. Also,',
see GDDM manuals: General Information (GC33-0319), Guide for',
Users (SC33-0327)'
eturn txt
*================================================================*/
0202: procedure expose ml. fd. cmd. sb. mn. m@ wsn wsu nonam@
rg s,lvl .    /* s:section no.in this rtn, l:line no. in menu*/
race off
*   Output line text for menu node lvl 2 or 2) Function to generate
    node level 2 made of 0201, 0202, etc */
ignal value(s's0202')
s0202: /*-Set line for menu. */
eturn 'GDDM-ICU  PGF Interactive Chart Utility: Create charts.'
s0202: nonam@= 1      /* Dummy filename */
ddress CMS 'GLOBAL TXTLIB ADMPLIB ADMILIB ADMVLIB ADMKLIB ERXLIB ADMGLIB'
eturn ' ADMCHART '
s0202:  /*-Specify files used in d. array */
onam@= 1
su= 'ADMUCIMV EXEC *#PROFILE ADMDEFS *#ADMQPOST EXEC *#ADMCOLS * *#',
    'ADMPATT * *#ADMICUM * *#ADMICUP * *#'
eturn 'D'
s0202: nonam@= 1

@= ( gddmdoc(m@))||', and Interactive Chart Utility (SC33-0328).',
 The ICU manual does not require the user to be a programmer. For',
programming applications, see Programming Reference (SC33-0333)',
and Programming Summary (Booklet) (SX33-6054).',
&   Also see the other PGF programs: Vector Symbol Editor.'
@=m@|'&   Try' eturn 'H'
*================================================================*/
0203: procedure expose cmd. fd. sb. ml. mn. m@ wsn wsu nonam@
rg s,lvl .
ignal value(s's0203')
s0203:
eturn 'GDDM-VSE  PGF Vector Symbol Editor: Create variable size',
logos, symbols.'
s0203:        /* Set dummy name */
ddress CMS 'GLOBAL TXTLIB ADMPLIB ADMILIB ADMVLIB ADMKLIB ERXLIB ADMGLIB'
eturn 'ADMVSSE '
s0203: nonam@= 1
eturn 'D'
s0203: nonam@= 1
@= ( gddmdoc(m@))||', and Vector Symbol Editor (SC33-0329)',
The VSE manual does not require the user to be a programmer. For',
```

```
'programming applications, see Programming Reference (SC33-0333)',
'and Programming Summary (Booklet) (SX33-6054).',
'&   Also see the other PGF programs: Interactive Chart Utility'
return 'H'
/*===================================================================*/
s0204: procedure expose cmd. fd. sb. ml. mn. m@ wsn wsu nonam@
arg s,lvl .
signal value(s's0204')
0s0204:
return 'GDDM-ISE  Image Symbol Editor: Create multicolor logos,',
'symbols, patterns.'
1s0204:
nonam@= 2
address CMS 'GLOBAL TXTLIB ADMPLIB ADMILIB ADMVLIB ADMKLIB ERXLIB ADMGLIB'
return 'ADMISSE'
2s0204: nonam@= 1
return 'D'
3s0204: nonam@= 1
m@= ( gddmdoc(m@))||', and Image Symbol Editory (SC33-0330).'
return 'H'
/*===================================================================*/
s0205: procedure expose cmd. fd. sb. ml. mn. m@ wsn wsu nonam@
arg s,lvl .
signal value(s's0205')
0s0205:
return 'GDDM-IMD  Interactive Map Definition: Create screens',
'interactively (only).'
1s0205:              /* Dummy name */
address CMS 'GLOBAL TXTLIB ADMPLIB ADMILIB ADMVLIB ADMKLIB ERXLIB ADMGLIB'
return 'ADMIMD'
2s0205:
wsn= 'ADMMSL ADMGGMAP COPY ADMPRINT ADMLIST ADMIFMT ADMSYMBL'
wsu= 'ADMUCIMV EXEC *#PROFILE ADMDEFS *#ADMQPOST EXEC *#'
return 'D'
3s0205: nonam@= 1
m@= ( gddmdoc(m@))||', and Interactive Map Definition (SC33-0338).'
return 'H'
/*===================================================================*/
s0206: procedure expose cmd. fd. sb. ml. mn. m@ wsn wsu nonam@
arg s,lvl .
signal value(s's0206')
0s0206: nonam@= ?
return 'GDDM-MSL  Routine to compress Map Spec. Lib. files.'
1s0206: nonam@= 2  /* Parameters are not just filename */
address CMS 'GLOBAL TXTLIB ADMPLIB ADMILIB ADMVLIB ADMKLIB ERXLIB ADMGLIB'
return "ADMMSL COMP "cmd.2
2s0206:
wsn= 'ADMMSL'
return 'D'
3s0206: nonam@= 1
return  'Help GDDM'
/*===================================================================*/
s0207: procedure expose cmd. fd. sb. ml. mn. m@ wsn wsu nonam@
arg s,lvl .
signal value(s's0207')
0s0207: nonam@= 1
return 'GDDM     Graph language.'
1s0207: nonam@= 1
"GDDM"
return RC
2s0207:
return 'D'
3s0207: nonam@= 1
return 'HELP GDDM'
/*===================================================================*/
```

```
0208: procedure expose cmd. fd. sb. ml. mn. m@ wsn wsu nonam@
rg s,lvl .
ignal value(s's0208')
s0208:
eturn 'GDDM-REXX REXX sample Execs.'
s0208: nonam@= 1
ddress CMS 'GLOBAL TXTLIB ADMPLIB ADMILIB ADMVLIB ADMKLIB ERXLIB ADMGLIB'
ay 'Set "DEFINE STORAGE 7M"'
eturn ' erxmodel; erxproto'
s0208: nonam@= 1
eturn 'D'
s0208: nonam@= 1
@= ( gddmdoc(m@))||', and REXX Guide (SC33-0478).'
eturn 'H'
*==================================================================*/
0209: procedure expose cmd. fd. sb. ml. mn. m@ wsn wsu nonam@
rg s,lvl .
race off
ignal value(s's0209')
s0209:
eturn 'GRAPHPAK   GDDM as used by APL2'
s0209: nonam@= 1
ddress CMS 'GLOBAL TXTLIB ADMPLIB ADMILIB ADMVLIB ADMKLIB ERXLIB ADMGLIB'
ush ')LOAD 2 GRAPHPAK'
eturn "APL2 WSSIZE(5000000)"
s0209: nonam@= 1
eturn 'D'
s0209: nonam@= 1
turn ' HELP APL2'
==================================================================*/
==================================================================*/
3: procedure expose ml. fd. cmd. sb. mn. m@ wsn wsu nonam@
g s,lvl .    /* s:section no.in this rtn, l:line no. in menu*/
ace off
     Output line text for menu node lvl 1 or 2) Function to generate
     node level 2 made of 0101, 0102, etc */
gnal value(s's03')
03: /*-Set line for menu. */
 For generating menu line, lvl 1 */
turn 'Chemistry     Gaussian 82, Gaussian 86'
03:
.lvl= 1           /* mn.0= levels 0, mn.i= #lines for menu i */
vl= mn.0
.lvl= 'mn.'lvl'=s03(1,'lvl')'
.0= 2             /* Set max fcn # in menu */
= ml.0+1
.mh= 'Chemistry Menu'    /* Menu heading */
.1=s0301( 0)      /* get parms to diplay, ex, fillst,h this lin*/
.2=s0302( 0)      /* Note Fcn, List files, Help are (1),(2),(3)*/
turn 'M'
.3=s0303( 0)
.4=s0304( 0)      /* Setup line 4 in menu */
.5=s0305( 0)
.6=s0306( 0)
turn 'M'
03:  /*-Specify files used in d. array */
turn 'D'
03: nonam@= 1
='A late version of GAUSSIAN 86 is available on LASCXA. Gaussian 82
 also still available. User is expected to have the manuals.'
:urn 'H'
==================================================================*/
01: procedure expose ml. fd. cmd. sb. mn. m@ wsn wsu nonam@
; s,lvl .    /* s:section no.in this rtn, l:line no. in menu*/
ice off
```

```
/*    Output line text for menu node lvl 1 or 2) Function to generate
      node level 2 made of 0101, 0102, etc */
signal value(s's0301')
0s0301: /*-Set line for menu. */
/* For generating menu line, lvl 1 */
return 'G82       Gaussian 82'
1s0301: nonam@= 1
return ' G82'
2s0301: /*-Specify files used in d. array */
nonam@= 1
return 'D'
3s0301: 'Help G82'
nonam@= 1
return
/*================================================================*/
s0302: procedure expose ml. fd. cmd. sb. mn. m@ wsn wsu nonam@
arg s,lvl .   /* s:section no.in this rtn, l:line no. in menu*/
trace off
/*    Output line text for menu node lvl 2 or 2) Function to generate
      node level 2 made of 0201, 0202, etc */
signal value(s's0302')
0s0302: /*-Set line for menu. */
/* For generating menu line, lvl 2 */
return 'G86       Gaussian 86'
1s0302: nonam@= 0
address CMS "LA g86"
return 'G86 'cmd.2
2s0302: /*-Specify files used in d. array */
nonam@= 1
return 'D'
3s0302: nonam@= 1
return 'G86'
/*================================================================*/
s0303: procedure expose cmd. fd. sb. ml. mn. m@ wsn wsu nonam@
arg s,lvl .
signal value(s's0303')
0s0303:
return 'XXXXXX    xxxxxxxxxxxxxxxxxxxxxxxxxxxxxxx'
1s0303: nonam@= 1
xxxxxx
return RESULT
2s0303: nonam@= 1
return 'D'
3s0303: nonam@= 1
return
/*================================================================*/
/*================================================================*/
s04: procedure expose ml. fd. cmd. sb. mn. m@ wsn wsu nonam@
arg s,lvl .   /* s:section no.in this rtn, l:line no. in menu*/
trace off
/*    Output line text for menu node lvl 1 or 2) Function to generate
      node level 2 made of 0101, 0102, etc */
signal value(s's04')
0s04: /*-Set line for menu. */
return 'Security        Encription, etc.'

1s04:
mn.lvl= 1            /* mn.0= levels 0, mn.i= #lines for menu i */
nlvl= mn.0
sb.lvl= 'mn.'lvl'=s04(1,'lvl')'
ml.0= 1              /* Set max fcn # in menu */
mh= ml.0+1
ml.mh= 'Security Menu'   /* Menu heading */
ml.1=s0401( 0)   /* get parms to diplay, ex, fillst,h this lin*/
```

```
:turn 'M'
l.2=s0402( 0)        /* Note Fcn, List files, Help are (1),(2),(3)*/
l.3=s0403( 0)
l.4=s0404( 0)        /* Setup line 4 in menu */
l.5=s0405( 0)
l.6=s0406( 0)
:turn 'M'
;04:   /*-Specify files used in d. array */
:turn 'D'
;04: nonam@= 1
@= 'Users are requested not to leave their terminals unattended. ',
Encryption can be done with Cipher.'
eturn 'H'
*================================================================*/
)401: procedure expose ml. fd. cmd. sb. mn. m@ wsn wsu nonam@
rg s,lvl .    /* s:section no.in this rtn, l:line no. in menu*/
race off
*     Output line text for menu node lvl 1 or 2) Function to generate
      node level 2 made of 0101, 0102, etc */
ignal value(s's0401')
;0401: /*-Set line for menu. */
* For generating menu line, lvl 1 */
:turn 'Cipher      Encryption program'
;0401: nonam@= 1          /* Dummy name */
:turn 'CIPHER'
;0401:   /*-Specify files used in d. array */
)nam@= 1
:turn 'D'
;0401: nonam@= 1          /* Dummy name */
:turn 'HELP CIPHER'
*================================================================*/
)402: procedure expose ml. fd. cmd. sb. mn. m@ wsn wsu nonam@
rg s,lvl .    /* s:section no.in this rtn, l:line no. in menu*/
race off
*     Output line text for menu node lvl 2 or 2) Function to generate
      node level 2 made of 0201, 0202, etc */
ignal value(s's0402')
s0402: /*-Set line for menu. */
eturn ''
s0402:
eturn RC
s0402:   /*-Specify files used in d. array */
eturn 'D'
s0402:
eturn
*================================================================*/
05: procedure expose ml..fd. cmd. sb. mn. m@ wsn wsu nonam@
rg s,lvl .    /* s:section no.in this rtn, l:line no. in menu*/
race off
*     Output line text for menu node lvl 1 or 2) Function to generate
      node level 2 made of 0101, 0102, etc */
ignal value(s's05')
s05: /*-Set line for menu. */
eturn 'VM System Param Password, memory, etc.'
s05:
n.lvl= 1             /* mn.0= levels 0, mn.i= #lines for menu i */
lvl= mn.0
b.lvl= 'mn.'lvl'=s05(1,'lvl')'
l.0= 1               /* Set max fcn # in menu */
ih= ml.0+1
l.mh= 'VM Sys Prgms'   /* Menu heading */
l.1=s0501( 0)        /* get parms to diplay, ex, fillst,h this lin*/
eturn 'M'
l.2=s0502( 0)        /* Note Fcn, List files, Help are (1),(2),(3)*/
```

```
ml.3=s0503( 0)
ml.4=s0504( 0)          /* Setup line 4 in menu */
ml.5=s0505( 0)
ml.6=s0506( 0)
return 'M'
2s05:   /*-Specify files used in d. array */
return 'D'
3s05: nonam@= 1
m@= 'Aids to tailor your terminal and machine to your specific needs.'
return ''
/*================================================================*/
s0501: procedure expose ml. fd. cmd. sb. mn. m@ wsn wsu nonam@
arg s,lvl .     /* s:section no.in this rtn, l:line no. in menu*/
trace off
/*   Output line text for menu node lvl 1 or 2) Function to generate
     node level 2 made of 0101, 0102, etc */
signal value(s's0501')
0s0501: /*-Set line for menu. */
return 'Dirm     User passwords, memory size, etc'
1s0501: nonam@= 1
return ' DIRM'
2s0501:  /*-Specify files used in d. array */
return 'D'
3s0501: nonam@= 1        /* Dummy address */
return ' DIRM ?'
/*================================================================*/
s0502: procedure expose ml. fd. cmd. sb. mn. m@ wsn wsu nonam@
arg s,lvl .     /* s:section no.in this rtn, l:line no. in menu*/
trace off
/*   Output line text for menu node lvl 2 or 2) Function to generate
     node level 2 made of 0201, 0202, etc */
signal value(s's0502')
0s0502: /*-Set line for menu. */
return 'G86      Gaussian 86'
1s0502:
return RC
2s0502:  /*-Specify files used in d. array */
return 'D'
3s0502:
return
/*================================================================*/
s06: procedure expose ml. fd. cmd. sb. mn. m@ wsn wsu nonam@
arg s,lvl .     /* s:section no.in this rtn, l:line no. in menu*/
trace off
/*   Output line text for menu node lvl 1 or 2) Function to generate
     node level 2 made of 0101, 0102, etc */
signal value(s's06')
0s06: /*-Set line for menu. */
return 'Communication   Sending files, notes; userids'
1s06:
mn.lvl= 1               /* mn.0= levels 0, mn.i= #lines for menu i */
nlvl= mn.0
sb.lvl= 'mn.'lvl'=s06(1,'lvl')'
ml.0= 3                 /* Set max fcn # in menu */
mh= ml.0+1
ml.mh= 'Communication Menu'    /* Menu heading */
ml.1=s0601( 0)     /* VMID */
ml.2=s0602( 0)     /* Delegate*/
ml.3=s0603( 0)     /* Note */
return 'M'
ml.4=s0604( 0)
ml.5=s0605( 0)
ml.6=s0606( 0)
return 'M'
```

```
506:   /*-Specify files used in d. array */
eturn 'D'
506:   nonam@= 1
?= 'Find users userid and node, setup DELEGATE to respond to notes,
send notes to other userids. Also how to send files between machines&'
?=m@ "For assistance connecting BITNET, send note to HENRY at LASCXA or
:o JIM at LASCXA."
:turn 'H'
:==================================================================*/
)601: procedure expose ml. fd. cmd. sb. mn. m@ wsn wsu nonam@
·g s,lvl .    /* s:section no.in this rtn, l:line no. in menu*/
ace off
     Output line text for menu node lvl 1 or 2) Function to generate
     node level 2 made of 0101, 0102, etc */
gnal value(s's0601')
0601:  /*-Set line for menu. */
turn 'VMID       VM User IDs on the LOSANGEL system'
0601:
nam@= 1           /* Dummy filename */
turn ' VMID'
0601:  /*-Specify files used in d. array */
turn 'D'
0601:
nam@= 1
='To be installed on XA about the 1st of March '
turn 'H'
=================================================================*/
602: procedure expose ml. fd. cmd. sb. mn. m@ wsn wsu nonam@
g s,lvl .    /* s:section no.in this rtn, l:line no. in menu*/
ace off
     Output line text for menu node lvl 2 or 2) Function to generate
     node level 2 made of 0201, 0202, etc */
gnal value(s's0602')
0602:  /*-Set line for menu. */
turn 'Delegate   Trnfrs files to another usr or notifies you are absent'
)602:
nam@= 1           /* Dummy filename */
turn ' DELEGATE'
)602:  /*-Specify files used in d. array */
turn 'D'
)602:
nam@= 1
= 'Not installed on LASCXA untill about the 1st of March'
turn
=================================================================*/
503: procedure expose ml. fd. cmd. sb. mn. m@ wsn wsu nonam@
; s,lvl .    /* s:section no.in this rtn, l:line no. in menu*/
ice off
     Output line text for menu node lvl 1 or 2) Function to generate
     node level 2 made of 0101, 0102, etc */
;nal value(s's0603')
)603:  /*-Set line for menu. */
:urn 'NOTE       Send a note to another userid'
)603:
:urn ' Note 'cmd.2
)603:  /*-Specify files used in d. array */
:urn 'D'
)603:
nam@= 1
lress CMS screen 2
:urn 'HELP NOTE'
:================================================================*/
': procedure expose ml. fd. cmd. sb. mn. m@ wsn wsu nonam@
; s,lvl .    /* s:section no.in this rtn, l:line no. in menu*/
ice off
```

```
/*   Output line text for menu node lvl 1 or 2) Function to generate
     node level 2 made of 0101, 0102, etc */
signal value(s's07')
0s07: /*-Set line for menu. */
return 'RSP Help        Help for local commands'
1s07:
mn.lvl= 1                /* mn.0= levels 0, mn.i= #lines for menu i */
nlvl= mn.0
sb.lvl= 'mn.'lvl'=s07(1,'lvl')'
ml.0= 2
                         /* Set max fcn # in menu */
mh= ml.0+1
ml.mh= 'RSP Help'        /* Menu heading */
ml.1=s0701( 0)           /* Help LASC */
ml.2=s0702( 0)           /* SIB */
return 'M'
ml.4=s0704( 0)           /* */
ml.5=s0705( 0)
ml.6=s0706( 0)
return 'M'
2s07:
return 'D'
3s07: nonam@= 1
m2= 'Type 7 to get help'
return 'H'
/*==================================================================*/
s0701: procedure expose ml. fd. cmd. sb. mn. m@ wsn wsu nonam@
arg s,lvl .    /* s:section no.in this rtn, l:line no. in menu*/
trace off
/*   Output line text for menu node lvl 1 or 2) Function to generate
     node level 2 made of 0101, 0102, etc */
signal value(s's0701')
0s0701: /*-Set line for menu. */
/* For generating menu line, lvl 1 */
return 'Help LASC       LASC local help facility   '
1s0701:
nonam@= 1                /* Dummy name */
'Help LASC'
return RC
2s0701:
return 'D'
3s0701: nonam@= 1        /* Dummy name */
return 'Help LASC'
/*==================================================================*/
s0702: procedure expose ml. fd. cmd. sb. mn. m@ wsn wsu nonam@
arg s,lvl .    /* s:section no.in this rtn, l:line no. in menu*/
trace off
/*   Output line text for menu node lvl 2 or 2) Function to generate*/
signal value(s's0702')
0s0702: /*-Set line for menu. */
return 'SIB             System Information Bulletins'
1s0702:
nonam@= 1
return ' SIB'
2s0702:
return 'D'
3s0702: nonam@= 1        /* Dummy name */
'Help LASC SIB'
m2= 'To view SIB entries, hit PF11 (peek)'
return 'H'
/*==================================================================*/
s0703: procedure expose cmd. fd. sb. ml. mn. m@ wsn wsu nonam@
arg s,lvl .
signal value(s's0703')
0s0703:
return 'Nmove Help      Information on Move to new site'
1s0703:
```

```
onam@= 1              /* Dummy Name */
return ' NMOVE'
s0703:
return 'D'
s0703:
onam@= 1
return ' HELP NMOVE'
/*=============================================================*/
s0705: procedure expose cmd. fd. sb. ml. mn. m@ wsn wsu nonam@
arg s,lvl .
signal value(s's0705')
s0705:
return 'xxx'
s0705:
xx
return RESULT
s0705:
return 'D'
s0705:
return
/*=============================================================*/
/*=============================================================*/
s08: procedure expose ml. fd. cmd. sb. mn. m@ wsn wsu nonam@
arg s,lvl .    /* s:section no.in this rtn, l:line no. in menu*/
trace off
*    Output line text for menu node lvl 1 or 2) Function to generate
     node level 2 made of 0101, 0102, etc */
signal value(s's08')
s08: /*-Set line for menu. */
return 'VM Help'  /* For generating menu line, lvl 1 */
s08:
m.lvl= 1           /* mn.0= levels 0, mn.i= #lines for menu i */
lvl= mn.0
m.lvl= 'mn.'lvl'=s08(1,'lvl')'
m.0= 6             /* Set max fcn # in menu */
m= ml.0+1
m.mh= 'VM HELP'    /* Menu heading */
m.1=s0801( 0)      /* get parms to diplay, ex, fillst,h this lin*/
m.2=s0802( 0)      /* Note Fcn, List files, Help are (1),(2),(3)*/
m.3=s0803( 0)
m.4=s0804( 0)
m.5=s0805( 0)
m.6=s0806( 0)
return 'M'
s08:  /*-Specify files used in d. array */
return 'D'
s08: nonam@= 1
return ' HELP '
/*=============================================================*/
s0801: procedure expose cmd. fd. sb. ml. mn. m@ wsn wsu nonam@
arg s,lvl .
signal value(s's0801')
s0801:
return 'VM HELP         Help for the major VM components'
s0801: nonam@= 1
return ' HELP '
s0801:
return 'D'
s0801: nonam@= 1
return ' HELP SELF'
/*=============================================================*/
s0802: procedure expose cmd. fd. sb. ml. mn. m@ wsn wsu nonam@
arg s,lvl .
signal value(s's0802')
```

```
0s0802:
return 'CMSSET        Help for CMS Set commands'
1s0802: nonam@= 1
return ' HELP CMSSET'
2s0802:
return 'D'
3s0802: nonam@= 1
return ' HELP CMSSET'
/*================================================================*/
s0803: procedure expose cmd. fd. sb. ml. mn. m@ wsn wsu nonam@
arg s,lvl .
signal value(s's0803')
0s0803:
return 'CMSQUERY      Help for CMS Query commands'
1s0803: nonam@= 1
return ' HELP CMSQUERY'
2s0803:
return 'D'
3s0803: nonam@= 1
return ' HELP SELF'
/*================================================================*/
s0804: procedure expose cmd. fd. sb. ml. mn. m@ wsn wsu nonam@
arg s,lvl .
signal value(s's0804')
0s0804:
return 'CPSET         Help for the CP Set commands'
1s0804: nonam@= 1
return ' HELP CPSET'
2s0804:
return 'D'
3s0804: nonam@= 1
return ' HELP SELF'
/*================================================================*/
s0805: procedure expose cmd. fd. sb. ml. mn. m@ wsn wsu nonam@
arg s,lvl .
signal value(s's0805')
0s0805:
return 'CPQUERY       Help for the CP Query commands'
1s0805: nonam@= 1
return ' HELP CPQUERY'
2s0805:
return 'D'
3s0805: nonam@= 1
return ' HELP SELF'
/*================================================================*/
s0806: procedure expose cmd. fd. sb. ml. mn. m@ wsn wsu nonam@
arg s,lvl .
signal value(s's0806')
0s0806:
return 'FULLSCREEN HELP Guide to using CMS fullscreen facility'
1s0806: nonam@= 1
return ' HELP CMSSET FULLSCREEN'
2s0806:
return 'D'
3s0806: nonam@= 1
say 'Hi. Press PF3'
return ' HELP CMSSET FULLSCREEN'
/*================================================================*/
/*================================================================*/
s09: procedure expose ml. fd. cmd. sb. mn. m@ wsn wsu nonam@
arg s,lvl .    /* s:section no.in this rtn, l:line no. in menu*/
trace off
/*   Output line text for menu node lvl 1 or 2) Function to generate
     node level 2 made of 0101, 0102, etc */
```

```
signal value(s's09')
0s09: /*-Set line for menu. */
return 'IAD Menu'  /* For generating menu line, lvl 1 */

1s09:
mn.lvl= 1              /* mn.0= levels 0, mn.i= #lines for menu i */
nlvl= mn.0
sb.lvl= 'mn.'lvl'=s09(1,'lvl')'
ml.0= 6                /* Set max fcn # in menu */
mh= ml.0+1
ml.mh= ''        /* Menu heading */
ml.1=s0901( 0)        /* get parms to diplay, ex, fillst,h this lin*/
return 'M'
ml.2=s0902( 0)        /* Note Fcn, List files, Help are (1),(2),(3)*/
ml.3=s0903( 0)
!s09:  /*-Specify files used in d. array */
return 'D'
!s09:
return
'*=========================================================*/
:10: procedure expose ml. fd. cmd. sb. mn. m@ wsn wsu nonam@
:rg s,lvl .   /* s:section no.in this rtn, l:line no. in menu*/
:race off
*    Output line text for menu node lvl 1 or 2) Function to generate
     node level 2 made of 0101, 0102, etc */
ignal value(s's10')
s10: /*-Set line for menu. */
eturn 'IAD Menu'  /* For generating menu line, lvl 1 */ s10:
n.lvl= 1              /* mn.0= levels 0, mn.i= #lines for menu i */
lvl= mn.0
b.lvl= 'mn.'lvl'=s10(1,'lvl')'
1.0= 6                /* Set max fcn # in menu */
h= ml.0+1
1.mh= ''        /* Menu heading */
1.1=s1001( 0)        /* get parms to diplay, ex, fillst,h this lin*/
eturn 'M'
1.2=s1002( 0)        /* Note Fcn, List files, Help are (1),(2),(3)*/
1.3=s1003( 0)
eturn 'M'
s10:  /*-Specify files used in d. array */
eturn 'D'
s10:
sturn ''
 Roy Daw; 213-312-5471; LASC; node LASCXA userid ROY */
 06/23/89: Revised this for IAD restart, USER vs IAD filedefs.
 IAD bugs compensated for, error exits aligned */
 Sample EXEC to use linemode DEBUG
      1) For counting execution frequencies of statements.
      2) For vector statistics
      3) For vector timing information             */
 Roy Daw 213-312-5471. IBM LASC */
 Invokes VS FORTRAN Interactive Debug in line mode. */
&&&&&&&&&&&&&&&&&&&&&&&&&&&&&&&&&&&&&&&&&&&&&&&&&&&&&&&&&&&&&*/
ace off
P SP CONSOLE CLOSE TERM PURGE'
g pn vs prgnam rtnnams
pgmnm= prgnam
= 1
 If no arguments, give help */
 prgnam='' then do
c='Syntax is: IADLINMD IADno V|S prgname. IADno may be 0 to 5 or IAD'
if address=XEDIT then msg c
else say c
```

```
    signal exitpgm
    end
"SET CMSTYPE HT"
"STATE "prgnam" TEXT *"
rcl= rc
"SET CMSTYPE RT"
if RC1<>0 then do
   c= 'Program 'prgnam' does not exist'
   if address=XEDIT then msg c
   else say c
   signal exitpgm
   end
if pn<>'IAD' then do
   /* Extract out the filedefs for LINE MODE, put in $temp$ exec */
   push prgnam 'EXEC'
   push  'MACRO IADLINFD ( LIFO )'
   "XEDIT "prgnam" EXEC"
   pull filnms
   'EXEC $TEMP$'           /* Execute the user's filedefs if any*/
   end /*__Specify whether this is a vector or scalar compilation__*/
call IADLINM1 prgnam
pull nm
if ((nm=-1)|(RESULT=1)) then signal exitpgm
pull vs1
if nm<>prgnam then mnpgmnm= nm  /* program name = that from source */
/* if S or V not specified as calling parameter, use listing's value*/
if (vs<>'S')&(vs<>'V') then vs=vs1
else do  /* V or S was specified on calling seq */
   if vs<>vs1 then do
      say 'Vectorization on listing does not agree with',
                        'that on IADLINMD second parameter'
      signal exitpgm
      end
   end /*__Now execute 6 cases__*/
pne= pn
if (datatype(pn)='CHAR')&¬(pn='') then do
   if pn='IAD' then do
      /* Create restart file for IAD, chk compile is for debug, chk
         for restart file recfm, correct for bug in IAD */
      filnms= iadrsp(prgnam)
      if (RESULT=1) then signal exitpgm
      end
   else do
      /*??Move this check to start of program */
      "MSG * First argument must be IAD, a number 0 to 5, OR "" for 0,..5"
      signal exitpgm
      end
   end
else
   do
      if pn= '' then do ;pn= 0;pne= 5; end
      else do
         if ¬((pn>=0)&(pn<=5)) then do
            MSG '* Third argument must be a number between 0 and 5'
            signal exitpgm
            end
         end
   do i= pn to pne
      if (i>=2)&(i<=4) then
         if (vs<>'V') then do
            say 'Program listing shows program is not vectorized'
            signal exitsitr
            end
```

```
/* Do not print to display */
/*'SET CMSTYPE  HT' */
/* Create a log file, deleting the old log, if any. */
"SET CMSTYPE HT"
"LIST "prgnam" LOG"i":*"vs" A (EXEC"
rcl= RC
"SET CMSTYPE RT"
if rcl=0 then do
  push 5 prgnam mnpgmnm vs 3
  push 'MACRO IADLINMD'
  "XEDIT CMS EXEC"
  pull m
  m= m+1
  end
else m= 0
/*__Identify the output files to the system (filedefs)__*/
'FILEDEF AFFOUT DISK' prgnam 'LOG'i':'m||vs' (RECFM F LRECL 80'
fdf5=0; fdf6=0
"Q FILEDEF (stack"
do while queued()><0
  pull a
  parse var a nm 'DISK' etc
  if (nm='FT06F001')|(nm=6) then fdf6=1
  if (nm='FT05F001')|(nm=5) then fdf5=1
end
* 'FILEDEF 6 DISK' prgnam 'LOGCNSL'||vs' (PERM RECFM F LRECL 80'*/
if fdf5=0 then "FILEDEF 5 TERMINAL"
if fdf6=0 then "FILEDEF 6 TERMINAL"
/* Create a print file, dleting the old print if any. */
'FILEDEF AFFPRINT DISK' prgnam 'PRINT'i||vs
/* if there is an include or affon file, use it */
'STATE' prgnam 'AFFON'i ' *'
if RC<>0 then do
  affoniad= 1
  say "USING default IAD AFFON"i" file"
ay prgnam mnpgmnm
  push 1 prgnam mnpgmnm vs 3
  push 'MACRO IADLINMD'
  "XEDIT IAD AFFON"i
  end
else do
  affoniad= 0
  say "Using user's existing customized "prgnam" AFFON"i" file"
  end
'FILEDEF AFFON DISK 'prgnam' AFFON'i '*'
/* If there is a restart or affin file, use it. */
'STATE' prgnam 'AFFIN'i' *'
if RC<>0 then do
  affiniad= 1
  say "Using default IAD AFFIN"i" file"
  push 1 prgnam mnpgmnm vs 3
  push 'MACRO IADLINMD'
  "XEDIT IAD AFFIN"i
  end
else do
  affiniad= 0
  say "Using user's existing customized "prgnam" AFFIN"i" file"
  end
'FILEDEF AFFIN DISK 'prgnam' AFFIN'i ' *'

/* Now execute the prgnam for four cases:
  The following DEBUG commands should be moved to the AFFIN file for
      Fortran version 2.3. Frequency and timing cant be done during
      the same run, so two runs are made: the first for freq & the 2nd
      for sampling. TEST option is not needed for frequency or DEBUG
      in Fortran ver. 2.3.
```

In general printing is sent to the AFFPRINT file type PRINT or
    PRINTSC or PRINTVC. (Note: My ARYSC directory only shows scalar
    and the ARYVC only shows vector files!! )
The vector commands LISTVEC and STATVEC are only usable in 2.3.

1) Get frequency data: no ENTRY in the AFFON file entries, so have
   hooks on all statements by default. Need GO to start after
   START * DEBUG as DEBUG stops at first entry in MAIN.
2) Get timing data by sampling: ENTRY in AFFON file to speed up
   This eliminates all hooks except at the entry.
   ENDDEBUG stops debugging mode (and frequency), but initiates
   sampling, and starts the program instead of GO */
/* Note that AFFON file must not have ENTRY specified if want freq*/
/* This conflicts with sampling for vector timing? */
/* or if wish nonrelocatable module, do
'GENMOD' artest
 artest 'DEBUG'                      */
/*============*/
/* Define VS FORTRAN V2 library and required system libraries. */
"SET CMSTYPE HT"
'STATEW VSF2FORT TXTLIB A'
rcl= rc
"SET CMSTYPE RT"
if rcl=0 then say 'Using VSF2FORT ON YOUR OWN A DISK'
else
   do
        'STATE VSF2FORT TXTLIB *'
        if RC><0 then
        do
           say 'VSF2FORT TXTLIB missing. Did you LA FORTVS?'
           signal exitcsitr
           end
        end
/* 'GLOBAL TXTLIB ' */
   'GLOBAL LOADLIB VSF2LOAD'
   'Q TXTLIB (LIFO'
   pull ctxtlib
   parse var ctxtlib 'TXTLIB' ' =' txtlibs
   say "User's txtlib is "ctxtlib
   if txtlibs='NONE' then do
      'GLOBAL TXTLIB VSF2FORT CMSLIB TSOLIB '
      say "User does not have TXTLIB in his exec, so"
      say "TXTLIB VSF2FORT CMSLIB TSOLIB specified for user"
      end
   /*=============================*/
   /* If want to load and run the program, do it for expanded storage */
   /*'LOAD' prgnam rtnnams '(CLEAR AMODE 31' */
/*  'LOAD' prgnam rtnnams '(CLEAR AMODE 31' (1) mod */
/*  'LOAD' filnms rtnnams '(CLEAR AMODE 31'*/
   if QUEUED()<>0 then say '***ERROR: Stack not empty at load time'
   'LOAD' filnms rtnnams '(CLEAR '
   say ''
   say 'WARNING:'
   say 'Data to the console is being shutoff for',
   'this execution. If program blows up, you can check by doing',
   '#CP Q T twice. The CPU time should be increasing. If not',
   'executing, turn console on with "#CP SP CONSOLE CLOSE STOP TERM".'
   say 'Then look in the rdr file for execution info.'
   say ''
   ind
/*  'SPOOL CONSOLE START TO * NOTERM' */
   'EXECIO * CP (STEM Y. ST IND USER'
   'START * DEBUG'
   'EXECIO * CP (STEM Z. ST IND USER'
   /* Now get ready for a "VECTOR STATISTICS RUN" */
   /***************************************************************/

```
   /* Give Timing Statistics                                                    */
   /*++++++++++++++++++++++++++++++++++++++++++++++++++++++++++++++++++++++++++*/
   call rsptime prgnam,y.6,y.8,z.6,z.8
   /*++++++++++++++++++++++++++++++++++++++++++++++++++++++++++++++++++++++++++*/
   exitcsitr:             /* Close up and skip this iteration */
   'SPOOL CONSOLE STOP CLOSE'
   if affiniad= 1 then "ERASE "prgnam" AFFIN"i
   if affoniad= 1 then "ERASE "prgnam" AFFON"i
   exitsitr:
   end
 end
citpgm: exit RC         /* Exit the program */
/****************************************************************************/
*                       IADLINM1 EXEC                                        */
/*++++++++++++++++++++++++++++++++++++++++++++++++++++++++++++++++++++++++++*/
* IADLINM1 exec will determine name of main program of
  fortran deck, and
  determine whether the compiled program was for vector or scalar. */
* SYNTAX: EXEC IADLINM1 ; at end do pull nm, pull vs for V OR S.*/
idlinm1: procedure  expose prgnam mnpgmnm rg fname
race off
f fname='' then do
 say 'Filename not specified'
 return 1
 end
ish 3 "" "" "" ""      /* Set other parameters to null */
ish 'MACRO IADLINMD'   /* Macro to check name in text */
(EDIT 'fname' TEXT'
"STATE "fname" LISTING"
 if RC<>0 then do
r  do i=1 by 1 while queued()>0
      pull aa.i
      end
      aa.0= i-1  */
   do until (vs='V')|(vs='S')
     "MSG * "fname" LISTING IS MISSING. CANNOT DETERMINE IF SCALAR ",
     "OR VECTOR, please specify V or S."
     pull vs
     end
   push vs
r  do i=1 by 1 while i <= aa.0
     push aa.i
     end   */
   end
 else do
   /* 'MAIN' or '....' is in stack */
   push 2 prgnam mnpgmnm vs ""
   push 'MACRO IADLINMD'
   'XEDIT 'fname" LISTING"
   /* 'MAIN' or main program name from SOURCE is in stack, followed */
   /*       by V for vector, S for scalar in stack */
   end
:turn 0
'=========================================================================*/
 This exec checks for consistency of restart program FILE FORMAT for
 use by IAD, and leaves the user in the IAD log file when IAD is
 exited. This file displays IAD errors and output data. 'QQ' to exit
 This exec calls IAD1 which calls IAD in order to correct for IAD
 bug: RESTART file with global txtlib is processed after program is
 initially loaded, so txtlibs are not used. They will be used if IAD
 is restarted. If an exec file exists, a RESTART file is created.
 the exec file must have the same name as the program */
DRSP: PROCEDURE EXPOSE mnpgmnm vs
ace off
```

```
arg fn
if fn='' then do
  msg 'Syntax is IADRSP filename'
  return 1
  end
'SET CMSTYPE HT'
'STATE TABLES MACLIB'
if RC=0 then 'ERASE TABLES MACLIB'
'SET CMSTYPE RT'
'STATE 'fn' RESTART '
if RC<>0 then do
  "msg * no "fn" RESTART  file exists"
  "STATE "fn" EXEC"
  /* Create a dummy or create a restart file from users exec */
  "msg * RESTART file created "
  push fn 'RESTART'
  push 'MACRO IADLINFD ( LIFO )'
  "XEDIT "fn" EXEC"
  pull filnms
  end
/* Set recfm to F */
push 6 fn mnpgnnm vs 3
push 'MACRO IADLINMD'
'XEDIT 'fn' RESTART'
/* Call routine IAD1 to correct for txtlib bug, then call IAD */
call IAD1 fn
/*'XEDIT 'fn' LOG'*/     /* EXIT IAD and leave user in LOG file */
return filnms
/*---------------------------------------------------------------*/
/* The following corrects for a bug in IAD: Loads before restart */
IAD1:  PROCEDURE
/* Make IAD exec use txtlib from restart file if it exists */
trace off
arg fn
"STATE "fn" RESTART "
if RC=0 then do    /* If there is a restart file ? */
  push 7           /* Execute the IAD macro in IADLINMD XEDIT */
  push "IADLINMD ( LIFO )"
  "XEDIT "fn" RESTART"
say 'we are here ********************'
  /* Now set the global txtlib command */
  address CMS
  "EXEC $TEMTXLB" /* Execute exec before IAD is executed */
  end
do i=1 by 1 while QUEUED()<>0
  pull qq.i
  end
qq.0= i-1
/* Execute the standard IAD exec on y disk */
"EXEC IAD "fn
do i= 1 to qq.0
  queue a.i
  end
return
/* Get filedefs from a user's exec for running on IADLINMD or IAD */
/* 06/22/89: Add generation of restart files for IAD */
/*__If program exec exists, the EXEC or RESTART files can be created__*/
trace off
pull prgnam ftyp
address CMS
/* Extract out the filedefs */
/*"SET CMSTYPE HT" */
/*__If program exec exists, the EXEC or RESTART files can be created__*/
select
```

```
    when ftyp='EXEC' then do
      "ERASE $TEMP$ EXEC"
      aa= "* Filedef dummy for 'prgnam' EXEC created by IADLINFD EXEC"
      bb= ''
      "EXECIO 1 DISKW $TEMP$ EXEC A1 (FINIS VAR AA"
      address XEDIT "SET FNAME $TEMP$"
      end
    when ftyp='RESTART' then do
      aa= "* RESTART file from "prgnam" EXEC if it exists"
      address XEDIT "SET FTYPE RESTART"
      "EXECIO 1 DISKW "prgnam" RESTART A1 (FINIS VAR AA"
      end
    otherwise do
      say 'Illegal filetype in IADLINFD'
      signal exit0
      end
    end
'STATE "prgnam" EXEC A"
 c1= rc
'SET CMSTYPE RT"
 ddress 'XEDIT'
 f rc1=0 then do
  "SET MSGMODE OFF"
  "SET WRAP OFF"
  'DISPLAY 0 2'
  'TOP'
  'N'
  "EXTRACT /CURLINE"
  xtyp= ''
  if left(strip(CURLINE.3,'L'),2)='/*' then xtyp= 'r'
  if xtyp= 'r' then do
    /*__ For REXX EXECS, eliminate comments __*/
    'C ,/*$*/,, * *'
    "TOP"
    DO until RC<>0
      "CL ,/*,"
      if RC=0 then do
        "C ,/*$,,"              /* Delete comment to end of line */
        "EXTRACT /LINE"
        m= LINE.1
        "CL ,*/,"
        'C ,$*/,,'
        "EXTRACT /LINE"
        n= LINE.1
        l= n-m-1
        ':'m+1
        "DELETE "l
        end
      end
    end
  else
    do until RC<>0
      /*__ Eliminate comments for non REXX execs __*/
      'F *'
      if RC=0 then 'DELETE'
      end
/*__ Now extract command statements from exec and put in $temp$ __*/
trace off
  call extract 'filedef'
  call extract 'global txtlib'
  call extract 'erase'
/*__ Get load statement's file_names _____*/
  filnms= getldfilnms()    /* Assumes only one load module */
say filnms
  'SET CASE MIXED'
  "TOP"
```

```
     "DISPLAY 2"
     if ftyp='RESTART' then do
       'C //syscmd / *'
       "PUT * "prgnam" RESTART A"
       "QQUIT"
       end
     else do
       "PUT * $TEMP$ EXEC"
       "QQUIT"
       end
     end
  else do
    "QQUIT"
    end
/*__Add exit to EXEC file_____*/
exit0: address CMS
if ftyp='EXEC' then "EXECIO 1 DISKW $TEMP$ EXEC A1 (FINIS VAR BB"
push filnms
exit
/%ZZZZZZZZZZZZZZZZZZZZZZZZZZZZZZZZZZZZZZZZZZZZZZZZZZZZZZZZZZ*/
/*__ Subroutine to extract load statement's file_names __*/
Getldfilnms: procedure   Expose ftyp xtyp
trace off
call extract 'load'     /* First keywd? */
/* Remove last line selected as 2 */
'DISPLAY 2'
'BOT'
'EXTRACT /CURLINE'
'DEL'
"DISPLAY 0"
parse upper var CURLINE.3 'LOAD' filnms '(' etc
return filnms
/%ZZZZZZZZZZZZZZZZZZZZZZZZZZZZZZZZZZZZZZZZZZZZZZZZZZZZZZZZZZ*/
/*__ Subroutine to extract one command on one or two keywds __*/
/*  If EXEC is REXX, continued lines are combined & quotes removed*/
/*  If filetype 'RESTART', quotes are removed */
Extract: procedure   Expose ftyp xtyp
parse upper arg keywd keywd2
trace off
/* keywd selects lines to be extracted. Restart= r => file is restart*/
'TOP'
'L /'keywd'/'
do while RC=0
  /*++Get keyword++*/
    "EXTRACT /CURLINE"
 /*  a= strip(CURLINE.3,'T')*/
    a= strip(CURLINE.3,'L')
    if left(a,1)="'" then  w= strip(word(a,1),"L","'")
    else w= strip(word(a,1),"L",'"')
    upper w
    if w<>keywd then do
      'L /'keywd'/'
      iterate
      end
    if keywd2<>'' then do
      w2= word(a,2)
      upper w2
      if w2<>keywd2 then do
        'L /'keywd'/'
        iterate
        end
      end
    c= right(a,1)
    "SET SELECT 2"
```

```
/*++Include continued lines++*/
  DO i=1 by 1 while c= ','
    'N'
    'SET SELECT 2'
    'EXTRACT /CURLINE'
    c= right(strip(CURLINE.3,'T'),1)
    end i
  'L /'keywd'/'
  end
/*__If REXX exec, eliminate quotes, combine continued lines__*/?
if (xtyp='r.') then do
  'SET DISPLAY 2'                     /* Display all selected lines */
  /* Quotes are ok for IADLINMD $temp$ exec */
  /*       but not for restart */
  'TOP'
  'L /'keywd'/'                       /* To first keywd line */
  do while RC=0
    c= ','
    d= ''
    do while c=','
      "EXTRACT /CURLINE"
      a= strip(CURLINE.3,'B')
      b= left(a,1)
      c= right(a,1)
      if (b="'") then    /* Eliminate quotes */
        if c=',' then
          parse var a with "'"a"',"
        else
          parse var a with "'"a"'"
      else if (b='"') then
        if c=',' then
          parse var a with '"'a'",'
        else
          parse var a with '"'a'"'
      d= d||a
      "DELETE"
      end
    "U"
    "INPUT "d
    "SELECT 2"
          'L /'keywd'/'
            end
          'SET DISPLAY 0'
        end
      return
```

Time all the modules of the program. Compare changes */
For documentation, see IAD AFFIN0 file on RSPTLS disk */
AFFIN0: This is in units of .xxxxxx sec. See 'FN affon0 file.
************************************************************
Files with filetype affin can be changed to filetype restart
    and then used with the filetype affon for fullscreen mode.
There are 6 sample program runs made by FRTXQ EXEC:
    FN affin5 and FN affon5: freq of exec
    FN affin4 and FN affon4: list vec statistics all rtns.
    FN affin3 and FN affon3: prog sampling to determine
            relative execution time of stmts, do loops, etc.
    FN affin2 and FN affon2: Time analyzable do loops.
    FN affin1 and FN affon1: Time the routines of the prog.
    FN affin0 and FN affon0: Total exec. time of prog.
************************************************************
TERMIO IAD

```
*===========================================================================
*                       TIME the entire PROGRAM
*===========================================================================
*Time 'main' program and all called routines.
   TIMER (Pn@)
*Now resume execution after stop at start of main program by IAD.
   GO
   LISTTIME
*Execution errors are on unit 6 if you allocated a unit 6. Otherwise
*    they are shown in the latest LOG3:nn file where nn= 0,1...
   QUIT

*Time the ROUTINES of the program. Use to find hotspots.
*For documentation, see IAD AFFIN1 file on RSPTLS disk.
*AFFIN1:
****************************************************************
*+     This is for vector tuning of pgms compiled with 'vector(iva)
*+         option in units of .xxxxxx sec.
*+     TIMER commands activate timing for Program or DOloop,
*+         and allow selection of routines, or loops.
*+         Also allows comparing runs using ESSL routines
*+     See 'FN affon1' file.
*+     LISTTIME commands display the timing information, which is
*+         only for routines here.
****************************************************************
   TERMIO IAD
*Activate timer for timing all (*) elegible routines. 'Affon1' file
*selects the programs that are eligible. TIMER nm will time 'nm' if
*'nm' is eligible.
   TIMER *
*    TIMER OFF essl_rtn   if comparing compiled essl_rtn with ESSL rtn
*                         Time will be included in calling rtns.
*Now start execution after stop at start of 'main routine' by IAD.
   GO
****************************************************************
*+           TIME all ROUTINES in the PROGRAM                   *
*+    Times do not include the time for a ROUTINE'S called subroutines *
*+    , if the subroutines are compiled for interactive debug,  *
*+    since the routines 'selected to be timed' by the TIMER cmd do   *
*+    not have their times included in that of a calling routine.    *
*+    NOTE: This means time for called ESSL subroutines will be  *
*+    included in the timing of a routine. Switching to ESSL may cause *
*+    the timing of a routine to suddenly increase. To compare ESSL   *
*+    executions, set 'TIMER OFF ESSLrtn' for compiled esslrtn   *
****************************************************************
*Write timing information table for 'all' programs selected by
*TIMER command from those made eligible by AFFON1 file.
   LISTTIME
*Note: To restart in 'fullscreen mode', type command RESTART.
*This exec is in line mode, leave IAD for run #1 (AFFIN1 & AFFON1)
   QUIT

*Time analyzable DOLOOPS for vector tuning.
*For documentation, see IAD AFFIN2 file on RSPTLS disk.
*AFFIN2:
****************************************************************
*     This is for vector tuning of pgms compiled with 'vector(iva)
*         option in units of .xxxxxx sec. IVA is not available
*         with scalar compilations, so this only applies to
*         vectorized code.
*     TIMER commands activate timing for Program or DOloop (here),
*         and allow selection of routines, or loops.
*     See 'FN affon2' file which must have '(ALL) * DOLOOP'
*     LISTTIME commands display the timing information, which is
*         only for doloops here.
*     The program takes 6 to 7 times longer to execute.
****************************************************************
```

```
    TERMIO IAD
'Activate timer for timing DOLOOPS for all programs. 'Affon2' file
'selects the programs to be timed.
    TIMER *.* DOLOOP
'Start execution after stop at start of main by IAD.
    GO
!=====================================================================*
!               TIME the DO LOOPS in the specifed ROUTINE
!=====================================================================*
'Provide timing information table for ANALYZABLE doloops, for FN1
'program only (if doloop hooks selected by 'affon2' file), in print file.
    LISTTIME Pn@.* DOLOOP    This would time only Pn@ routine.
!=====================================================================*
!               TIME the DO LOOPS in all ROUTINES
'Provide timing information table for 'ANALYZABLE' doloops, for
'all programs with doloop hooks selected in 'affon2' file, in print file.
!=====================================================================*
    LISTTIME *.* DOLOOP
'Note: To restart in 'fullscreen mode', do RESTART command.
'Line mode, leave IAD for run #2.
    QUIT
Show relative timings of programs, and doloops.
    For documentation, see IAD AFFIN3 file on RSPTLS disk.
(1)List sampling counts by doloop, or program unit. Statement not done
(2)List percentage of program unit samples and total no. of samples.
AFFIN3:
!*********************************************************************
    Start the program for sampling with the ENDDEBUG command. After    *
    it runs to completion, there is a variety of ways to list the      *
    sampling counts includeing bar charts, tables, etc. See log, print
        files.
    See FN AFFON3 file.                                                *
!*********************************************************************
Set IAD input-output mode.
    TERMIO LIBRARY
Start execution after stop at start of 'main' by IAD. Run to
completion. Every 4 miliseconds (min), the pgm will be interrupted
and the location of the interruption recorded.
Keywd CALLED says sampling data will be recorded for all routines
and the listsamp and annotate command can select with CALLed or ALL.
    ENDDEBUG SAMPLE(4) CALLED
Doloop:
!*********************************************************************
        *Annotate compiled PROGRAM LISTINGS with RELATIVE TIMES*        *
!*********************************************************************
!*********************************************************************
            *Get RELATIVE TIMES for ROUTINES in the PROGRAM*            *
!*********************************************************************
!=====================================================================*
        Get RELATIVE TIME for TOP 8 ROUTINEs in the PROGRAM             *
        The time includes called routines plus routine's time.          *
!---------------------------------------------------------------------*
            LISTSAMP * SUMMARY ALL TOP(8)
!=====================================================================*
        Get RELATIVE TIME for every ROUTINE in the PROGRAM              *
        The time does not include that of called routines               *
!---------------------------------------------------------------------*
List a table of all routines and the sum of the
sampling counts made not counting called programs of the routine.
            LISTSAMP * SUMMARY DIRECT
!=====================================================================*
        Get RELATIVE TIME for CALLS of every ROUTINE in the PROGRAM     *
        The time consists of ONLY that of the called routines           *
!---------------------------------------------------------------------*
List a table of all routines and the sum of the sampling counts made
by counting only called programs of the routine.
            LISTSAMP * SUMMARY CALLED
```

```
*=====================================================================*
*       Get RELATIVE TIME for every ROUTINE in PROGRAM                 *
*       The time includes called routines plus routine's time.         *
*---------------------------------------------------------------------*
*Summarize sampling counts by program unit in table
        LISTSAMP * SUMMARY ALL
***********************************************************************
*            *Get RELATIVE TIMES for DO LOOPS in the PROGRAM*          *
***********************************************************************

*=====================================================================*
*       Get RELATIVE TIME for top 12 of all DO LOOPs in all ROUTINEs   *
*       The time does not include that of routines called within the LOOP *
*---------------------------------------------------------------------*
        LISTSAMP *.*         DOLOOP DIRECT      TOP(12)

*=====================================================================*
*       Get RELATIVE TIME for every DO LOOP in 'every' ROUTINE         *
*       The time does not include that of routines called within the LOOP *
*---------------------------------------------------------------------*
        LISTSAMP *.*         DOLOOP DIRECT
*=====================================================================*
*       Get RELATIVE TIME for every DO LOOP in 'every' ROUTINE         *
*       The time is only that of routines called within the LOOP       *
*---------------------------------------------------------------------*
        LISTSAMP *.*         DOLOOP CALLED
*=====================================================================*
*       Get RELATIVE TIME for every DO LOOP in 'Main' ROUTINE          *
*       The time is only that of routines called within the LOOP       *
*       This is sample for timing one subroutine in program            *
*---------------------------------------------------------------------*
* Assumes main program named same as file or defaults to MAIN.         *
        LISTSAMP Fn@.* DOLOOP CALLED
        LISTSAMP MAIN.* DOLOOP CALLED
***********************************************************************
*       Annotate LISTING with RELATIVE TIMES of STATEMENTS and DO LOOPS *
*           in the PROGRAM.                                             *
*       A table of every ROUTINE's RELATIVE TIME follows all the listings*
***********************************************************************
        ANNOTATE * ALL
        quit

*AFFIN file for displaying vector stride and length information
*     for VECTORIZED programs.
*For documentation, see IAD AFFIN4 file on RSPTLS disk.
*AFFIN4:
***********************************************************************
*       A list of each program in the file compiled with SDUMP
*       with the associated VECTOR stride and length
*       information for the prg.  This is used
*       when vector tuning FN module compiled with vector
*       option 'iva' and debug option SDUMP. e.g. '(sdump vector(iva))'.
*       Note that the AFFON file must not have ENTRY specified if
*       frequency counts are wanted. (See IAD AFFON4 file)
*       This must run separately from "sampling" or vector timing?
***********************************************************************
        TERMIO IAD
*Activate DO LOOP length and stride recording.
        VECSTAT *.* ON
*Starts exec. after stop at start of main.
        GO
*=====================================================================*
* DISPLAY STRIDE and LENGTH information for every ROUTINE'S DOLOOPS
*=====================================================================*
*Display vector stride and length information, in the log file,
```

```
*for all DO LOOPS in the programs to be displayed
*(See IAD AFFON4 file).
      LISTVEC *.*
*================================================================*
*    LIST NAMES of all programs compiled for DEBUG with SDUMP OPTION
*================================================================*
*Get listing of all programs, compiled with SDUMP compiler option, in
*the log file.
      LISTSUBS
      QUIT Determine frequency of execution of statements or do loops, or those
      that have not been executed in currently QUALIFIED program.
      for VECTORIZED or SCALAR compiled programs.
 For documentation, see IAD AFFIN5 file on RSPTLS disk.
 AFFIN5:
**********************************************************
   Determines frequency of execution of statements in all (both)
   routines by executing in IAD debug mode.
   The AFFON5 (filetype) file defines the files and programs to be
   processed. The FRTXQ    EXEC does the filedefs, etc required.
   assumes compiled SDUMP option
   Most of the possible options are shown.
**********************************************************
   TERMIO IAD
Start execution
   GO
Get listing of programs debug parameters compiled with SDUMP option
into LOG file.
   LISTSUBS
Entry data table into log file, when in IAD line or fullscreen mode
Main pgm is assumed to be executed once?, no hooks.
   LISTFREQ ENTRY
Send table of statements that were not executed to log file.
   LISTFREQ ZEROFREQ
Get table of frequency data for default qualified MAIN program only
in same log file.
   LISTFREQ
Send freq data for only FN to log file: Q= QUALIFY.
   Q Pn@
   LISTFREQ
Annotate listings for all subroutines and put in print file
 For Fullscreen say ANNOTATE ON * FREQUENCY
   ANNOTATE * FREQUENCY
Execution finished, leave DEBUG mode for this program execution.
   QUIT AFFON0 file for timing the execution of a program.
 or documentation, see IAD AFFON0 file on RSPTLS disk.
**********************************************************
AFFON0 file for use with AFFIN0 file for FN module's
      IAD linemode execution.
The 'ALL' stmt is set for most efficient timing of 'total program'
      as only the main program needs to have entry hooks for timing.
      See 'FN affin0' file.
**********************************************************
LL) ENTRY
@
one of the other programs have any hooks
LL) NONE AFFON1 file for timing all the routines in a program.
 or documentation, see IAD AFFON1 file on RSPTLS disk.
**********************************************************
AFFON1 file for use with AFFIN1 file for FN module's IAD
         linemode execution.
Restricts debugging hooks to entry, exit for efficient pgm timing.
```

```
* AFFON files function is to:
*       1) Specify names of listing files, IVA files (Pgm Info. file),
*          or restrict the debugging hooks.
*****************************************************************
* The nxt stmt sets the default hooks for all programs executed after
* the AFFON file to allow the most efficient timing of all routines,
* thru restricting debugging hooks to only entry and exit hooks.
 (ALL) entry

* AFFON2 file for timing all doloops in a program compiled with
*       the vector option with the 'IVA' option.
*For documentation, see IAD AFFON2 file on RSPTLS disk.
*****************************************************************
* AFFON2 file for use with the AFFIN2 file for FN module's
*     IAD linemode execution.
* The nxt stmt is set for ONLY'do loop analysis' hooks on all statements
*     Note this is for vector tuning on 'doloops so requires compiler
*     option 'vector(iva)'. This AFFON file entry assumes all fortran
*     files are in the FN FORTRAN file or have files with their
*     own names.
* If selected files were to be timed, those should follow the 'ALL'
*     statement, followed by another 'ALL' that resets the defaults
*     for all other programs to have LISTING and 'PIF' files with
*     their own file names, and all statements have debugging hooks.
*     (Sample names shown as comments)
*****************************************************************
     (ALL) 'Fn@ LISTING' 'Fn@ PIF' * DOLOOP
*    FN1     If this were not a comment only these would have hooks.
.*   FN2
*    (ALL)       This would reset all other routine's hooks to default.
* AFFON3 file to show bar chart of sampling counts and
*For documentation, see IAD AFFON3 file on RSPTLS disk.
* (1)List sampling counts by statement, doloop, or program unit.
* (2)List percentage of program unit samples and total no. of samples.
*****************************************************************
* AFFON3 file for use with AFFIN3 file for FN module's IAD
*         linemode execution.
* Do sampling counts for doloops only (not nested)
*****************************************************************
* The nxt stmt is set for ONLY'do loop analysis' hooks on all statements
 (ALL) 'Fn@ listing' 'Fn@ pif' * DOLOOP

* AFFON4 file for displaying vector stride and length information
*     for programs compiled with VECTOR option with 'iva'.
*For documentation, see IAD AFFON4 file on RSPTLS disk.
*****************************************************************
* AFFON4 file for use with AFFIN4 file for FN module's IAD
*         linemode execution.
* Restricts hooks to doloop analysis hooks for vector length and
*     stride commands of FN AFFIN4 file.
*****************************************************************
* The nxt stmt is set for 'do loop analysis' hooks to be placed
*     only ALL DO LOOPs that were in all subroutines that
*     are in the FN FORTRAN file. To process only selected
*     subroutines from the file, their names would have to follow the
*     AFFON file entry. A sample name is commented. If other programs
*     in a different file were to be processed, a second entry
*     with 'FN' replaced by the new name would process all
*     routines in that file, etc.
 (ALL) 'Fn@ listing' 'Fn@ pif' * DOVECT
* FN1         sample name
```

FFON5 file to determine frequency of execution of statements or do
oops, or those that 'have not been executed' in the currently
UALIFIED program, for a VECTORIZED or SCALAR compiled program.
r documentation, see IAD AFFON5 file on RSPTLS disk.
**********************************************************
FFON5 file for use with AFFIN5 file for FN module's IAD
    module's linemode execution. See Int Dbg Guide & Ref p45.
pecifies to use FN LISTING and FN PIF (program info
    file) for all files: main, and subroutines
**********************************************************
he nxt stmt * restricts to 'debugging' hooks (not do loop analysis
ooks) on all statements on all routines in the FN file.
ote this does not include ENTRY and EXIT hooks.
hich would be: (ALL) 'FN LISTING' 'FN PIF' ENTRY
L) 'Fn@ LISTING' 'Fn@ PIF' *
he nxt stmt is set for ONLY'do loop analysis' hooks on all stmts.
he sample for FN1:'FN1 include' file uses the following
 main 'FN listing' 'FN pif' * DOVECT 'hat is claimed is:

In a data processing system which contains an t program for enabling operation of a debug pro- 1 with a user program, said debug program requiring program parameters and file data from said user ram in order to operate in conjunction therewith, assist program performing a method which comprises the steps of:

splaying a menu of debug functions that are performable in conjunction with said user program, said displayed debug functions in said menu including timing an entire program, timing a subroutine in a program, timing a do-loop, computation of relative program segment execution times, and computing frequency of execution of statements or do-loops;

tomatically responding to a user's selection of a displayed debug function by extracting from said user program, parameters required for the operation of said debug function in conjunction with said user program, and placing said parameters in a format usable by said debug program; and iploying said parameters to construct input files for said debug program which include a command list required for said debug program to perform a displayed debug function in conjunction with said user program, and further define which program sequences within said user program are to be acted upon by said debug function; and causing execution of said debug function by employing said command list to operate upon said indicated program sequences of said user program.

2. The method of claim 1 wherein said debug program requires initialization with parameters from said user program before it can function in conjunction with said user program.

3. The method as defined in claim 1 wherein said employing step inserts said interrupt indications at every statement in said routine unless the user indicates otherwise.

4. The method of claim 1 wherein said menu further comprises a function which enables the user to operate the user program on a statement by statement basis, interactively.

* * * * *